US010499331B2

(12) United States Patent
Nakamura et al.

(10) Patent No.: US 10,499,331 B2
(45) Date of Patent: Dec. 3, 2019

(54) BASE STATION, RADIO COMMUNICATIONS SYSTEM, BASE STATION CONTROL METHOD, RADIO COMMUNICATIONS METHOD AND BASE STATION CONTROL PROGRAM

(71) Applicants: Toshifumi Nakamura, Minato-ku (JP); Kojiro Hamabe, Tokyo (JP); Masayuki Ariyoshi, Tokyo (JP); Kazushi Muraoka, Tokyo (JP)

(72) Inventors: Toshifumi Nakamura, Minato-ku (JP); Kojiro Hamabe, Tokyo (JP); Masayuki Ariyoshi, Tokyo (JP); Kazushi Muraoka, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/145,934

(22) Filed: Sep. 28, 2018

(65) Prior Publication Data
US 2019/0037490 A1 Jan. 31, 2019

Related U.S. Application Data

(60) Continuation of application No. 15/585,614, filed on May 3, 2017, now Pat. No. 10,123,267, which is a
(Continued)

(30) Foreign Application Priority Data

Oct. 27, 2008 (JP) .................................. 2008-275915

(51) Int. Cl.
*H04W 52/02* (2009.01)
*H04W 52/32* (2009.01)
(Continued)

(52) U.S. Cl.
CPC ....... *H04W 52/0206* (2013.01); *H04W 24/02* (2013.01); *H04W 52/0274* (2013.01);
(Continued)

(58) Field of Classification Search
CPC .............. H04W 72/082; H04W 24/02; H04W 28/0289; H04W 52/0203; H04W 52/04
See application file for complete search history.

(56) References Cited

U.S. PATENT DOCUMENTS 8,620,374 B2 * 12/2013 Nakamura ........ H04W 52/0274
455/522
8,838,126 B2 * 9/2014 Nakamura ........ H04W 52/0274
455/450
(Continued)

FOREIGN PATENT DOCUMENTS

| CN | 1324554 A | 11/2001 |
|---|---|---|
| CN | 1964574 A | 5/2007 |

(Continued)

OTHER PUBLICATIONS

Communication dated Apr. 22, 2015, issued by the European Patent Office in corresponding application No. 09823433.9.
(Continued)

*Primary Examiner* — Diane D Mizrahi
(74) *Attorney, Agent, or Firm* — Sughrue Mion, PLLC

(57) ABSTRACT

Because it is not possible to sufficiently reduce the number base stations that start uselessly in spite of being in a low traffic state, it is not possible to lower interference between adjacent cells and power consumption sufficiently. A base station starts transmission of a control signal with predetermined power when communication between another base station and a mobile station is started and a first predetermined condition is satisfied.

11 Claims, 16 Drawing Sheets

Related U.S. Application Data continuation of application No. 15/041,767, filed on Feb. 11, 2016, now Pat. No. 9,693,301, which is a continuation of application No. 14/465,896, filed on Aug. 22, 2014, now Pat. No. 9,301,166, which is a continuation of application No. 13/661,896, filed on Oct. 26, 2012, now Pat. No. 8,838,126, which is a division of application No. 13/126,325, filed as application No. PCT/JP2009/066569 on Sep. 15, 2009, now Pat. No. 8,620,374.

(51) Int. Cl.
*H04W 72/04* (2009.01)
*H04W 52/04* (2009.01)
*H04W 24/02* (2009.01)
*H04W 28/02* (2009.01)
*H04W 88/08* (2009.01)

(52) U.S. Cl.
CPC ......... *H04W 52/04* (2013.01); *H04W 52/325* (2013.01); *H04W 72/0406* (2013.01); *H04W 28/0289* (2013.01); *H04W 52/0203* (2013.01); *H04W 88/08* (2013.01); *Y02D 70/00* (2018.01); *Y02D 70/164* (2018.01)

(56) References Cited

U.S. PATENT DOCUMENTS

| | | | |
|---|---|---|---|
| 9,301,166 B2* | 3/2016 | Nakamura | H04W 52/0274 |
| 9,693,301 B2* | 6/2017 | Nakamura | H04W 52/0274 |
| 10,123,267 B2* | 11/2018 | Nakamura | H04W 52/0274 |
| 2006/0189308 A1 | 8/2006 | Kurata et al. | |
| 2009/0170519 A1 | 7/2009 | Wilhoite et al. | |
| 2010/0069073 A1 | 3/2010 | Chen et al. | |
| 2011/0134848 A1 | 6/2011 | Tamaki | |
| 2011/0207468 A1 | 8/2011 | Nakamura et al. | |
| 2011/0207500 A1 | 8/2011 | Nakamura et al. | |
| 2011/0317574 A1 | 12/2011 | Richardson | |
| 2012/0082064 A1* | 4/2012 | Awoniyi | H04W 24/10 370/255 |
| 2012/0207023 A1 | 8/2012 | Tsuda | |
| 2013/0088983 A1 | 4/2013 | Pragada et al. | |
| 2013/0250908 A1 | 9/2013 | Bach et al. | |
| 2014/0226621 A1 | 8/2014 | Choi et al. | |
| 2015/0223135 A1 | 8/2015 | Ratasuk et al. | |
| 2015/0288809 A1 | 10/2015 | Liang et al. | |
| 2016/0119969 A1* | 4/2016 | Vajapeyam | H04W 24/10 370/329 |
| 2016/0212775 A1 | 7/2016 | Xu et al. | |
| 2018/0324814 A1* | 11/2018 | Mueck | H04W 72/082 |

FOREIGN PATENT DOCUMENTS

| | | |
|---|---|---|
| CN | 101072391 A | 11/2007 |
| EP | 1775981 A1 | 4/2007 |
| JP | 661905 A | 3/1994 |
| JP | 10145842 A | 5/1998 |
| JP | 2002-204478 A | 7/2002 |
| JP | 2003032264 A | 1/2003 |
| JP | 2003-037555 A | 2/2003 |
| JP | 2003174456 A | 6/2003 |
| JP | 2005354549 A | 12/2005 |
| JP | 2007124642 A | 5/2007 |
| JP | 2008219645 A | 9/2008 |
| JP | 2014233081 A | 12/2014 |
| WO | 9857516 A3 | 12/1998 |
| WO | 0207464 A1 | 1/2002 |

OTHER PUBLICATIONS

Communication dated Jun. 23, 2015, issued by the Japanese Patent Office in counterpart Application No. 2014-153111.
Non Final Office Action issued in parent U.S. Appl. No. 13/661,896, dated Feb. 10, 2014.
NTT DOCOMO, et al., "Initial list of eNB measurements," 3GPP TSG-RAN WG1 #49bis, Jun. 29, 2007, pp. 2, R1-073156, http://www.3gpp.org/ftp/tsg_ran/WG1_RL1/TSGR1_49b/Docs/R1-073156.zip.
Office Action dated Jul. 1, 2013, issued by the State Intellectual Property Office of PRC in counterpart Chinese application No. 200980142915.3.
Communication dated May 9, 2017, from the Japanese Patent Office in counterpart application No. 2016-108599.
Communication dated Sep. 20, 2017, from the State Intellectual Property Office of the P.R.C., in counterpart Chinese application No. 201410681719.6.
Communication dated Jul. 30, 2019 from the Japanese Patent Office in Application No. 2018-196301.

* cited by examiner

BASE STATION, RADIO COMMUNICATIONS SYSTEM, BASE STATION CONTROL METHOD, RADIO COMMUNICATIONS METHOD AND BASE STATION CONTROL PROGRAM

CROSS REFERENCE TO RELATED APPLICATIONS

This application is a Continuation Application of U.S. patent application Ser. No. 15/585,614, filed May 3, 2017, which is Continuation of U.S. patent application Ser. No. 15/041,767, filed Feb. 11, 2016, now U.S. Pat. No. 9,693,301, which is a Continuation of U.S. patent application Ser. No. 14/465,896, filed Aug. 22, 2014, now U.S. Pat. No. 9,301,166 which is a continuation of U.S. application Ser. No. 13/661,896, filed on Oct. 26, 2012, now. U.S. Pat. No. 8,838,126, which is a Divisional of U.S. patent application Ser. No. 13/126,325, filed on Apr. 27, 2011, now U.S. Pat. No. 8,620,374, which is a National Stage of International Application No. PCT/JP2009/066569, filed on Sep. 15, 2009, which claims priority from Japanese Patent Application No. 2008-275915, filed on Oct. 27, 2008, the contents of all of which are incorporated herein by reference in their entirety.

TECHNICAL FIELD

The present invention relates to a base station, a radio communications system, a base station control method, a radio communications method and a base station control program.

BACKGROUND ART

As a mobile communications system, for example, a cellular system is known. A cellular system is a system to secure a communication range of a service area for a wide range by laying out cells (communication area of base stations which cover from several hundreds meters to several kilometers). By the way, in case of a cellular system, in order to avoid the situation where communication is impossible due to dark place or an increase of number of terminals in a service area, countermeasures which increase the number of the base stations are being performed. In that case, there are variously arrangement patterns of the base stations (for example, a case where a cover area of a certain cell overlaps with a cover area of a cell which is adjacent to the certain cell, a case where entire cover area of the certain cell is included in a cover area of other cell, and a case where each cover area of three or more cells overlaps).

However, the overlap and the inclusion of the cover area might cause the generation of radio wave interference between the base stations. Radio interference brings about lowering of channel capacity. Also, with an increase of number of base stations, in spite of a mobile station not existing in a cover area of the cell (that is, in spite of not being used at all), probability rises that a base station which is kept started exists. Electric power is wasted by a base station which is being started wastefully and without being used at all.

Accordingly, technologies aiming at interference avoidance or power savings in a mobile communications system are proposed. For example, Japanese Patent Application. Laid-Open No. 2003-37555 describes a technology in which a certain radio base station monitors a transmission signal transmitted from other radio base stations, and by considering traffic status and received power of other radio base stations, suspends transmission or starts transmission of own base station. The publication mentions that the number of base stations operating in low traffic and the interference in surrounding base stations are decreased. Further, the publication discloses a base station which, when traffic of other base stations is heavy, makes own base station return from a sleep state to a normal state, and covers at least one mobile station which cannot be accommodated by other stations in heavy traffic.

DISCLOSURE OF THE INVENTION

Problems to be Solved by the Invention

In the technology of the publication, own base station returns from the sleep state to the normal state only on the condition that traffic of an adjacent base station becomes heavy. However, even if heavy traffic is imposed on the adjacent base station, a mobile station which should be handed over from the adjacent base station to own base station may not exist actually. Accordingly, the base station of the publication has a concern that it returns to the normal state wastefully even though there does not exist a mobile station which should be handed over from the adjacent base station to own base station and as a result, consumes electric power wastefully. That is, the technology of the publication cannot reduce sufficiently the number of base stations which has been started wastefully in spite of the low traffic state. In consequence, the decreases of interference between adjacent cells and power consumption are insufficient.

An object of the present invention is to provide a base station, a radio communications system, a base station control method, a radio communications method and a base station control program capable of suppressing consumption of electric power of a base station and avoiding radio interference between base stations.

Measures for Solving the Problems

A base station of the present invention starts transmission of a control signal with predetermined power when communication between other base station and a mobile station is started and a first predetermined condition is satisfied.

Also, a radio communications system of the present invention includes a first base station, a second base station, and at least one mobile station which can communicate with the first base station and the second base station; and the second base station starts transmission of a control signal with predetermined power when communication between the first base station and the mobile station is started and a predetermined condition is satisfied.

Also, in a base station control method of the present invention, a base station around the other base station starts transmission of a control signal with predetermined power when communication between other base station and a mobile station is started and a predetermined condition is satisfied.

Also, in a radio communications method of the present invention, a second base station starts transmission of a control signal with predetermined power when communication between a first base station and a mobile station is started and a predetermined condition is satisfied. Also, a base station control program of the present invention makes a computer of base station around other base station execute processing which starts transmission of a control signal with predetermined power, when communication between the other base station and a mobile station is started and a predetermined condition is satisfied.

Also, a mobile station of the present invention is the mobile station which can communicate with a first base station and a second base station, and receives a control signal transmitted from the second base station with predetermined power when communication between the first base station and the mobile station is started and a predetermined condition is satisfied.

Effect of the Invention

According to the present invention, consumption of electric power of a base station is suppressed and radio interference between base stations is avoided.

DESCRIPTION OF CODE 1, 4, 5 Base station (first base station)
2, 2-1, 2-2 Base station (second base station)
11-17 Cell of base station
100-109 Mobile station
200 RNC
308 Load management unit
358 State change control unit
360 Power control unit
450 Location information acquisition unit

EXEMPLARY EMBODIMENTS OF THE INVENTION

In the following, exemplary embodiments of the present invention are described in detail with reference to drawings.

A second base station according to an exemplary embodiment of the present invention starts transmission of a control signal (in particular, a common control signal which will be broadcasted to the whole area of the cell) based on a start request which is transmitted from a predetermined equipment (for example, a radio network controller or a first base station), when communication between the first base station and a mobile station is started and a predetermined condition is satisfied.

Further, in each of the following exemplary embodiments, a case where a "pilot signal" which is a common control signal transmitting a signal of a predetermined pattern continually and repeatedly is employed as an example of the "control signal" is described.

First Exemplary Embodiment

Figure 1:
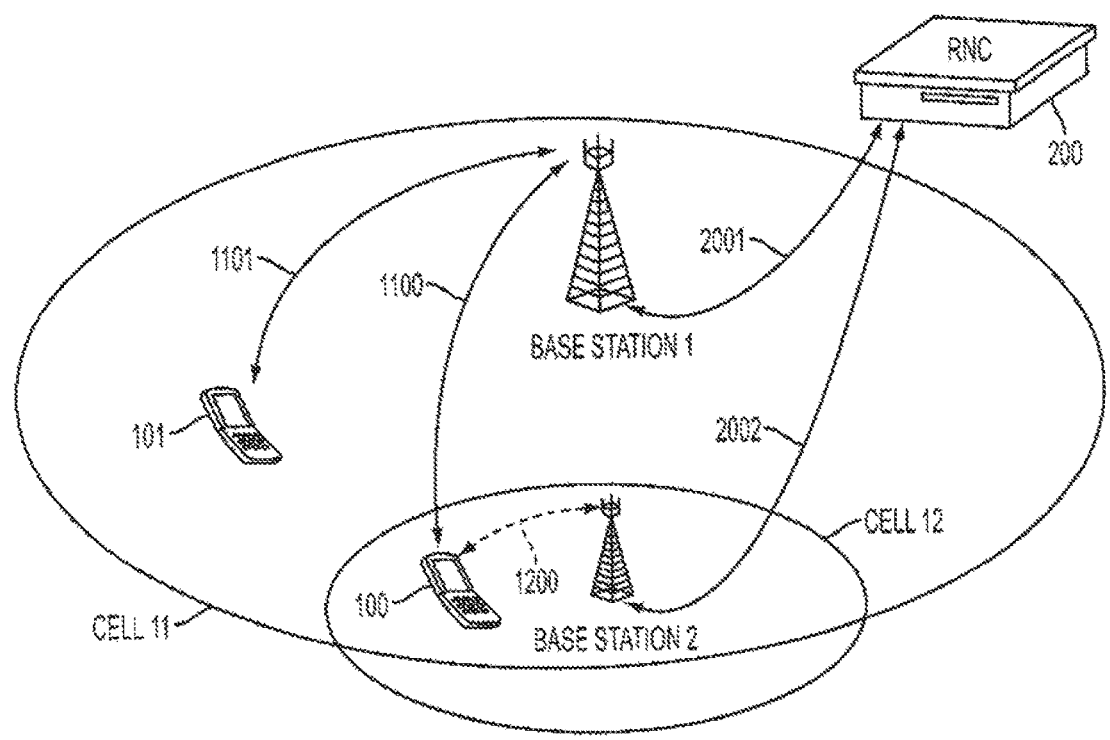
FIG. 1 A block diagram showing an example of a radio communications system according to the first exemplary embodiment of the present invention FIG. 2 A block diagram showing an example of a first base station of the first exemplary embodiment FIG. 3 A block diagram showing an example of a second base station of the first exemplary embodiment FIG. 4 An explanatory drawing about state change of the second base station FIG. 5 A sequence chart showing an example of operation of the radio communications system, when the second base station changes from an active state to a radio transmission suspension state FIG. 6 A flow chart illustrating an example of operation, when the second base station changes from the active state to the radio transmission suspension state FIG. 7 A sequence chart showing an example of operation of the radio communications system in the first exemplary embodiment on the occasion when the second base station changes from a radio transmission suspension state to an active state and hands over a mobile station which are accommodated in the first base station to the second base station FIG. 8 A flow chart showing an example of operation of the second base station in the first exemplary embodiment on the occasion when the second base station changes from a radio transmission suspension state to an active state and hands over a mobile station which are accommodated the first base station to the second base station FIG. 9 A block diagram showing an example of a first base station of the second exemplary embodiment FIG. 10 A sequence chart showing an example of operation of the radio communications system in the second exemplary embodiment on the occasion when the second base station changes from a radio transmission suspension state to an active state and hands over a mobile station which are accommodated in the first base station to the second base station FIG. 11 A block diagram showing another example of a radio communications system according to the second exemplary embodiment of the present invention FIG. 12 A block diagram showing an example of a radio communications system according to the third exemplary embodiment of the present invention FIG. 13 A sequence chart showing an example of operation of the radio communications system in the third exemplary embodiment on the occasion when the second base station changes from a radio transmission suspension state to an active state and hands over a mobile station which are accommodated in the first base station to the second base station FIG. 14 A figure describing a first method for carrying out handover processing of a control signal at a communication stage, and a sequence chart showing an example of operation of a radio communications system on the occasion when the second base station changes from a radio transmission suspension state to an active state and hands over a mobile station which are accommodated in the first base station to the second base station in the third exemplary embodiment FIG. 15 A figure describing a second method for carrying out handover processing of a control signal at a communication stage, and a sequence chart showing an example of operation of a radio communications system on the occasion when the second base station changes from a radio transmission suspension state to an active state and hands over a mobile station which are accommodated in the first base station to the second base station in the first exemplary embodiment FIG. 16 A figure describing a third method for carrying out handover processing of a control signal at a communication stage, and a sequence chart showing an example of operation of a radio communications system on the occasion when the second base station changes from a radio transmission suspension state to an active state and hands over a mobile station which are accommodated the first base station to the second base station in the first exemplary embodiment

FIG. 1 is a block diagram showing an example of a radio communications system according to the first exemplary embodiment of the present invention. This radio communications system includes a base station 1 (a first base station), a base station 2 (a second base station), a mobile station 100, a mobile station 101 and a Radio Network Controller 200 (hereinafter, referred to as "RNC"). The base station 1 transmits the pilot signal to the mobile station in a cell 11. The mobile station 100 and the mobile station 101 which received the pilot signal form a radio link 1100 and a radio link 1101 respectively and communicate with the base station 1. Similarly, the base station 2 can transmit the pilot signal to the mobile station in a cell 12. The mobile station 100 which received the pilot signal can form a radio link 1200 and communicate with the base station 2. Here, a part at least overlaps between the cell 11 and the cell 12. The RNC 200 is connected with the base station 1 through a line 2001 and is also connected with the base station 2 through a line 2002. The RNC 200 manages the base station 1 and the base station 2. Here, the line 2001 and the line 2002 may be either a cable line or a wireless line, and is described as the cable line in the following description.

Figure 2:
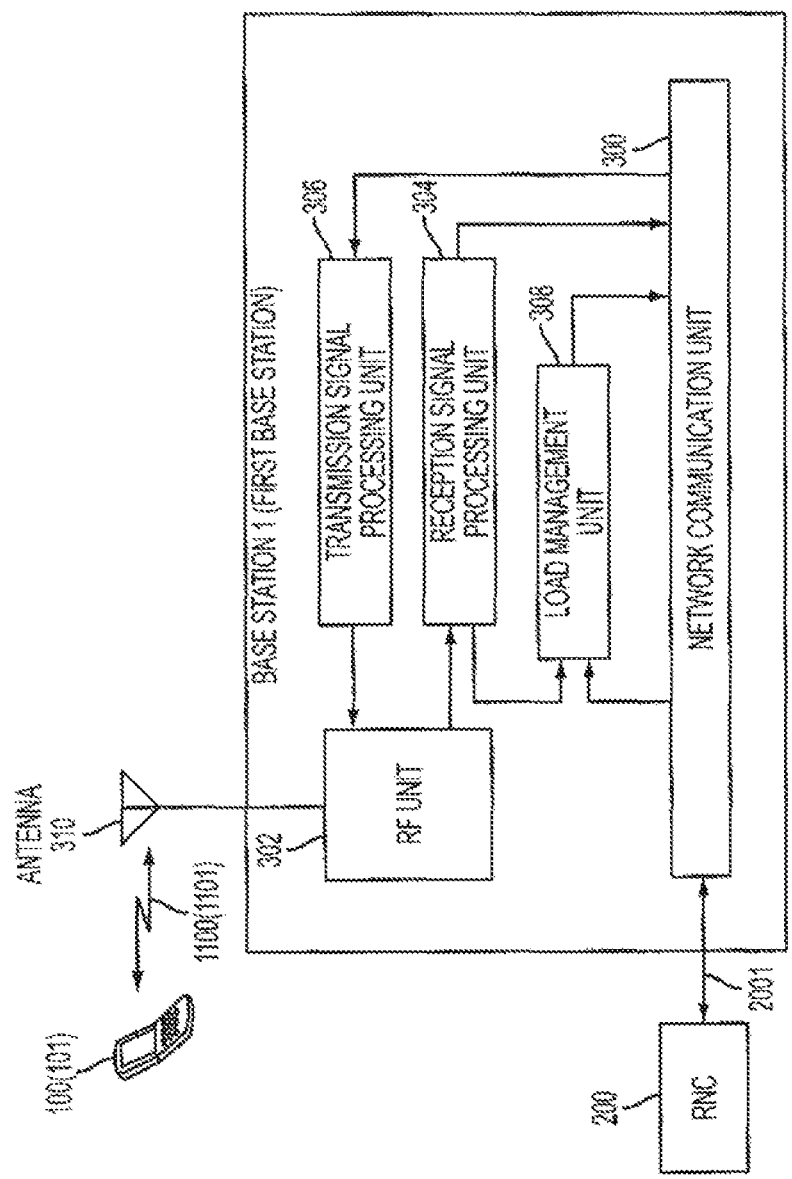

FIG. 2 is a block diagram showing an example of the base station 1 as the first base station shown in FIG. 1. The base station 1 includes a network communication unit 300, a RF (Radio Frequency) unit 302, a reception signal processing unit 304, a transmission signal processing unit 306, a load management unit 308 and an antenna 310. The network communication unit 300 performs cable communication with the RNC 200. The RF unit 302 performs radio communication with the mobile station 100. The reception signal processing unit 304 processes a signal received from the mobile station 100 via the RF unit 302. The transmission signal processing unit 306 processes a signal for transmitting to the mobile station 100 and transmits the signal to the RF unit 302. The load management unit 308 acquires communication traffic of the mobile station 100 which the base station 1 supports and number of the mobile stations 100 in the cell 11 from the reception signal processing unit 304 and the network communication unit 350 as load data.

Figure 3:
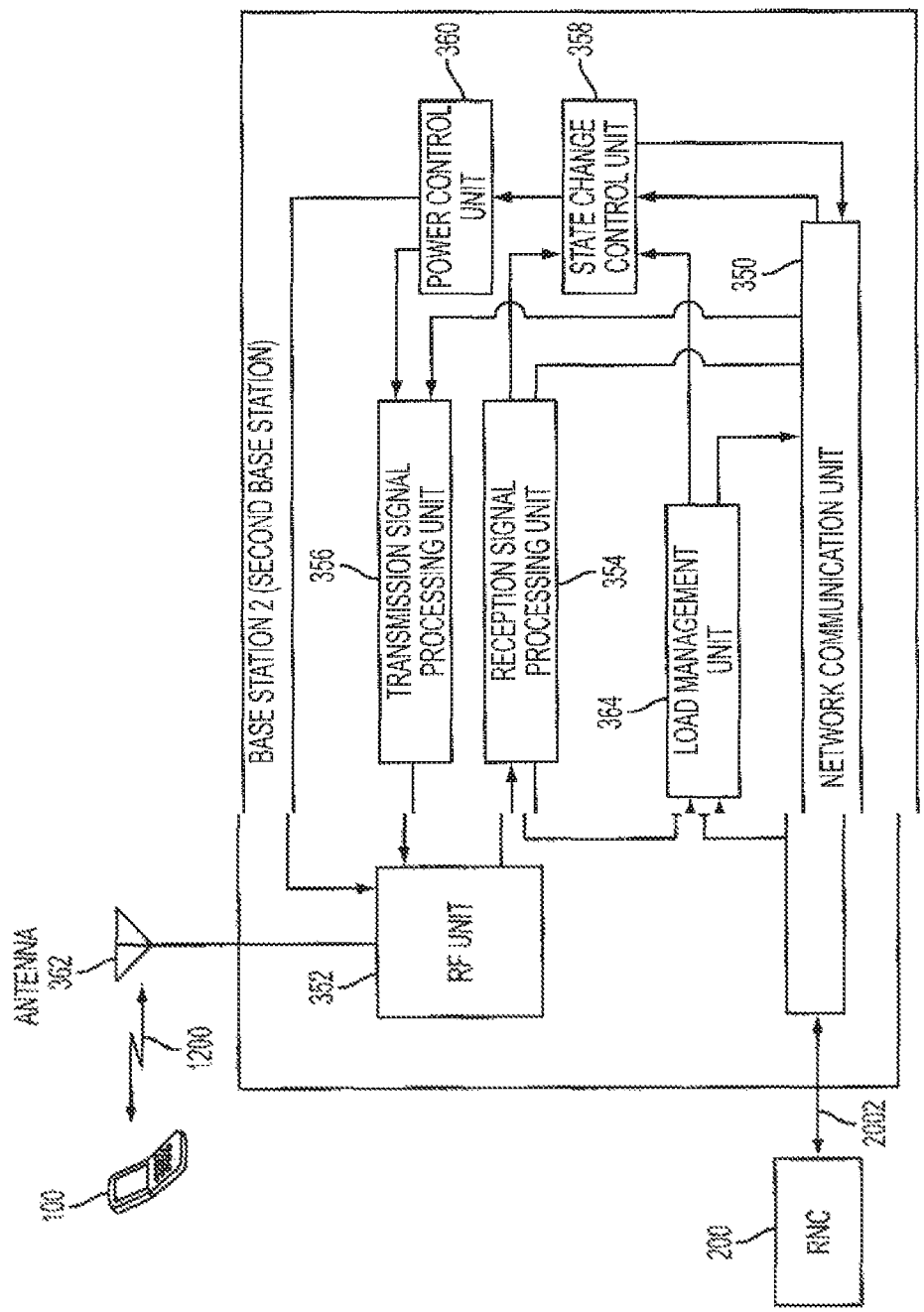

FIG. 3 is a block diagram showing an example of the base station 2 as the second base station shown in FIG. 1. The base station 2 includes a network communication unit 350, a RF unit 352, a reception signal processing unit 354, a transmission signal processing unit 356, a state change control unit 358, a power control unit 360, an antenna 362 and a load management unit 364. The network communication unit 350 performs cable communication with the RNC 200. The RF unit 352 performs radio communication with the mobile station 100. The reception signal processing unit 354 processes a signal received from the mobile station 100 via the RF unit 352. The transmission signal processing unit 356 processes a signal for transmitting to the mobile station 100 and transmits the signal to the RF unit 352. The load management unit 364 acquires communication traffic of a mobile station which the base station 2 supports and number of the mobile stations in the cell 12 from the reception signal processing unit 356 and the network communication unit 350 as load data, and determines a presence of load in the base station 2. Also, the load management unit 364 inquires of the RNC 200 via the network communication unit 350 a received power status (whether the received power concerned exceeds a threshold value) of a pilot signal of the base station 2 in a mobile station (for example, mobile station 101 in FIG. 1) which exists around cell 12. The state change control unit 358 controls, a change of operation states of the base station 2 according to the instructions or the information from the network communication unit 350, the reception signal processing unit 354 or the load management unit 364. The power control unit 360 executes electrical power control (for example, control of power ON/OFF) of the transmission signal processing unit 356, according to the instructions from the state change control unit 358. Besides, the power control unit 360 executes transmission power control and electrical power control (for example, control of power ON/OFF) of the RF unit 352, according to the instructions from the state change control unit 358.

Figure 4:
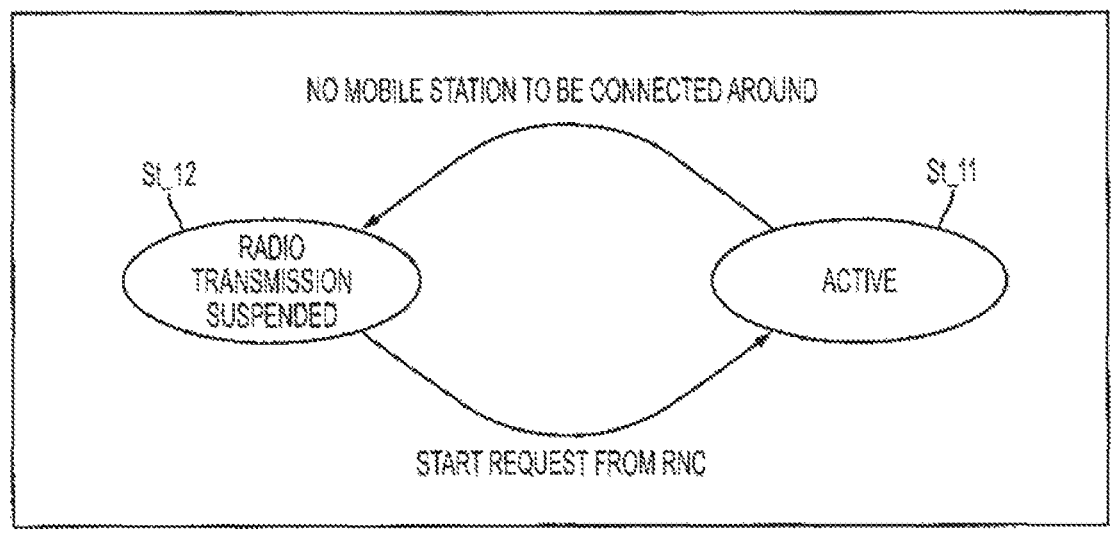

FIG. 4 is an explanatory drawing about state change of the base station 2 as the second base station. The base station 2 has two operation states as shown in FIG. 4. The first operation state is an active state St_11 in which the base station 2 can form the radio link 1200 with the mobile station 100 which resides in the cell 12. The second operation state is a radio transmission suspension state St_12. In the radio transmission suspension state St_12, radio signal transmitted from the base station 2 to the mobile station 100 is suspended and radio communication between the base station 2 and the mobile station 100 in the cell 12 becomes impossible.

The base station 2 executes the change from a certain operation state to another operation state whenever conditions like FIG. 4 are satisfied. A condition on which the base station 2 changes from the active state St_11 to the radio transmission suspension state St_12 is, for example, a condition that communication of the mobile station 100 in the base station 2 is disconnected and a mobile station which connects with the base station 2 does not exist any more. For example, when there exists a start request (that is, request for change from the radio transmission suspension state St_12 to the active state St_11) from the RNC 200 to the base station 2, the operation state of the base station 2 changes from the radio transmission suspension state St_12 to the active state St_11. Further, the "radio transmission suspension state" means, specifically, for example, a state in which electrical power or transmission function of the transmission signal processing unit 356 or the RF unit 352 are turned off by the power control unit 360, and transmission from the base station 2 to the mobile station 100 is suspended.

Figure 5:
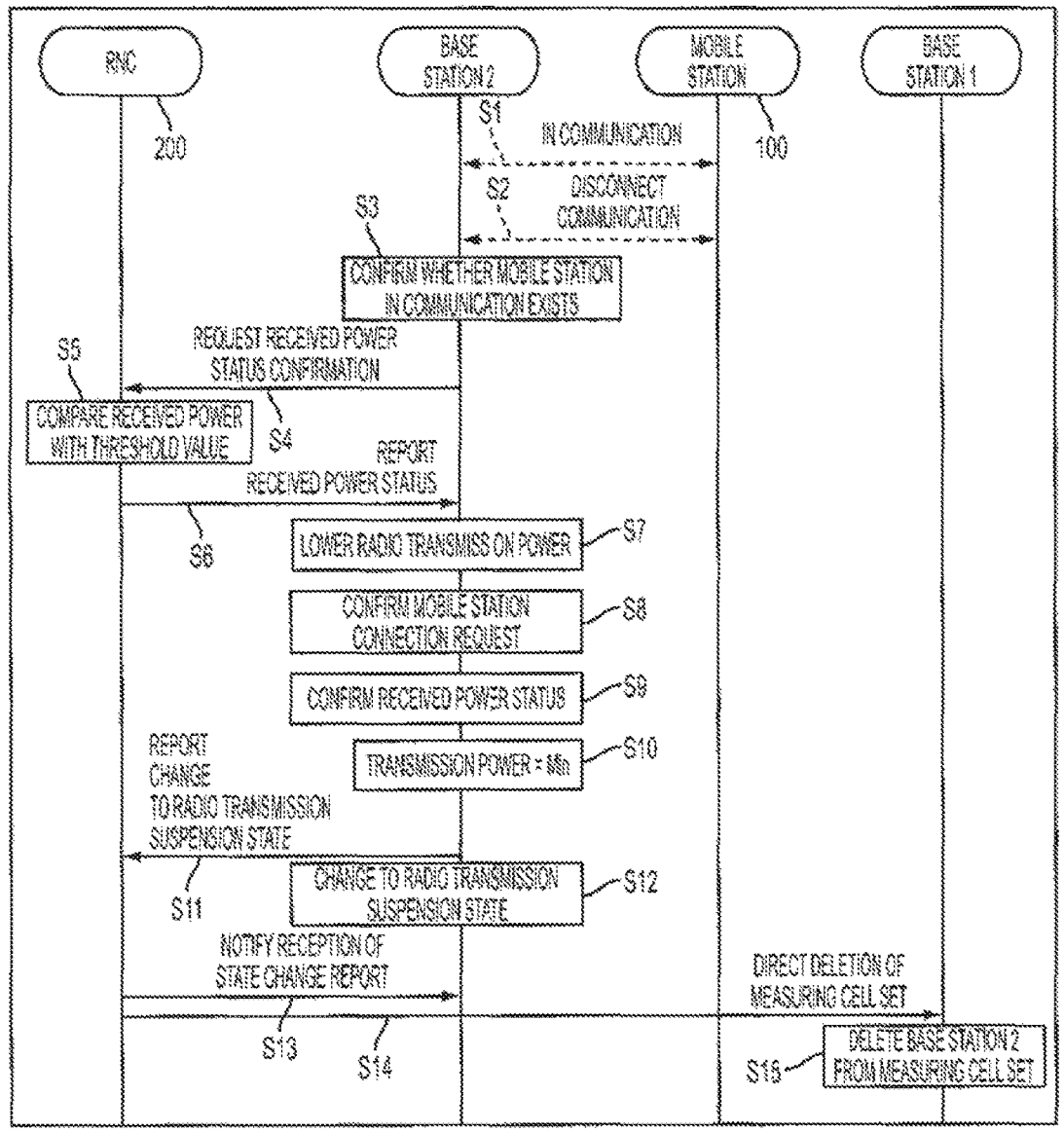

FIG. 5 is a sequence chart showing an example of operation of the radio communications system, when the base station 2 changes from the active state St_11 to the radio transmission suspension state St_12. FIG. 5 explains operation sequence among the mobile station 100, the base station 2 and the RNC 200.

The base station 2 is in communication with the mobile station 100 in the cell 12 (Step S1). Here, in general, a mobile station measures received power in the mobile station of the pilot signal of the base station (for example, the base station 1 and the base station 2 in FIG. 1) which is registered within a measurement cell set which is information reported from the base station in communication, and report the measurement result concerned to the RNC 200 periodically via the base station in communication. Here, the measurement cell set is a set which includes cells (base stations) which become a target for which the mobile station measures received power of the pilot signal transmitted from the base station. The measurement cell set is prepared for in each base station. The measurement cell set is reported to the mobile station under the communication. In general, own base station and the base stations around it are registered in the measurement cell set.

Here, by a certain reason, the mobile station 100 carries out communication disconnect processing to the base station 2 (Step S2). The base station 2 which received the communication disconnect request from the mobile station 100 confirms whether a mobile station in communication exists other than the mobile station 100 in the cell 12 of own base station (Step S3).

In case it is confirmed that a mobile station in communication does not exist other than the mobile station 100, the base station 2 transmits a received power status confirmation request to the RNC 200 (Step S4). Here, the received power status confirmation request issued from the base station 2 is described. The RNC 200 has a result which compared received power information of the pilot signal of the base station 2 in a mobile station (for example, the mobile station 101 in communication with the base station 1 in FIG. 1) in communication with other base station in the neighborhood of the cell 12 with a predetermined threshold value. The received power status confirmation request means processing in which the base station 2 requests this comparison result to the RNC 200. The RNC 200 which received the request concerned compares a measurement result of a mobile station (here, the mobile station 101) which received the pilot signal of the base station 2 and performed measurement with the threshold value (Step S5). Next, the RNC 200 transmits the comparison result (received power status in the mobile station) to the base station 2 (Step S6).

In case the comparison result mentioned above goes below the threshold value, and fixed time (5 seconds, for example) has passed, the base station 2 lowers transmission power of a transmission signal including the pilot signal gradually (for example, 1 dB per 0.1 second) (Step S7). Further, while the base station 2 is performing lowering processing of transmission power, the RNC 200 keeps comparing the measurement result of the received power of the pilot signal in the mobile station with the threshold value and keeps transmitting the comparison result to the base station 2. However, when a state change report of Step S11 described below is received, transmission of the comparison result is suspended. Next, while the base station 2 is lowering transmission power, whether a connection request from a new mobile station exists is confirmed (Step S8). Also, at the same time, whether the received power in the mobile station transmitted from the RNC 200 does not exceed the threshold value is confirmed (Step S9). In case there are no new connection requests and the received power concerned is lower than the threshold value, the base station 2 performs processing from Step S5 to Step S9 repeatedly until transmission power goes down for fixed quantity (20 dB, for example) (that is, until transmission power becomes $\frac{1}{100}$ of power in the active state St_11).

In case transmission power of the base station 2 goes below the predetermined threshold value (Step S10), the base station 2 notifies the RNC 200 of change to the radio transmission suspension state St_12 (Step S11). And the base station 2 which transmitted a state change report suspends radio transmission to the mobile station and changes to the radio transmission suspension state St_12 (Step S12). The RNC 200 which received the report concerned transmits a notification to the effect that the change report of the base station 2 was received by the RNC 200 to the base station 2 (Step S13). Also, together with transmitting the reception notification concerned, the RNC 200 directs the base station 1 to delete the base station 2 from the measurement cell set (Step S14). And the base station 1 which received the direction concerned updates the measurement cell set of the base station 1 and deletes the base station 2 (Step S15).

Figure 6:
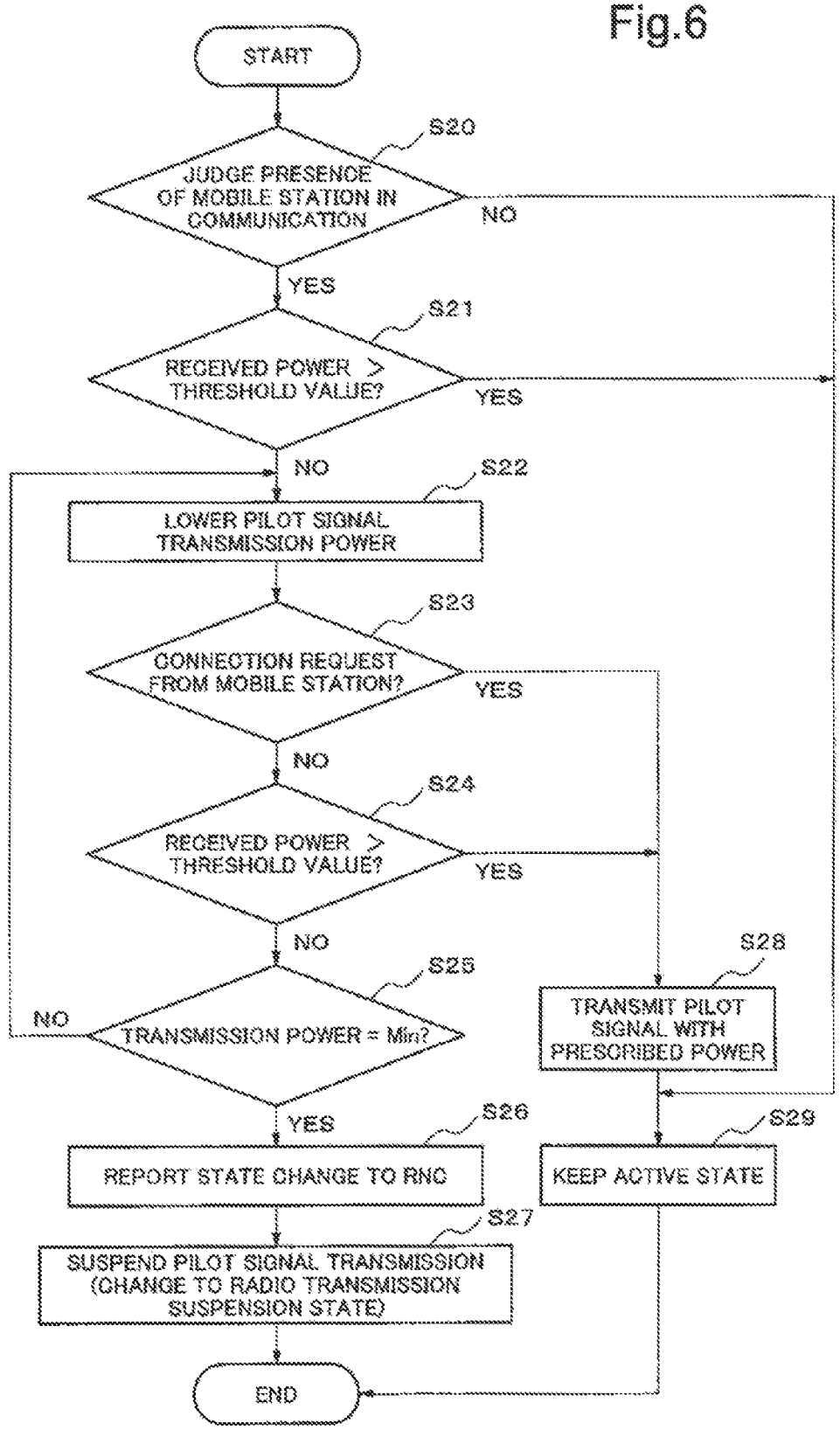

An example of operation of the base station 2 in case of change from the active state St_11 to the radio transmission suspension state St_12 is described using a flow chart of FIG. 6 and a base station block diagram of FIG. 3. Further, processing described in the flow concerned (that is, processing of change from the active state St_11 to the radio transmission suspension state St_12) is carried out when either of following three conditions is satisfied. The first condition (1) is, when communication of the mobile station 100 in communication in the cell 12 ended (in other words, in case a mobile station which communicates with the base station 2 does not exist any more). The second condition (2) is, when received power of the pilot signal of the base station 2 in the mobile station 100 which is in communication with other base station goes below a threshold value and fixed time has passed. The third condition (3) is, when starting of communication after change from the radio transmission suspension state St_12 to the active state St_11 cannot be performed, which is described below.

When either of the conditions (1)-(3) mentioned above is satisfied, the load management unit 364 of the base station 2 judges, as load data of the base station 2, a presence of a mobile station in communication (whether number of a mobile station is 0, or whether communication traffic is 0) (Step S20). In case a mobile station in communication with the base station 2 is judged "to exist" (in case judged as No in Step S20), the load management unit 364 issues a direction to the state change control unit 358 to keep an operation state of the base station 2 in the active state St_11 (Step S29). As a result, the state change control unit 358 directs the power control unit 360 to keep transmission power in a usual operation state, and as a result, the active state which is a usual communication state is kept.

In case a mobile station in communication is judged "not to exist" (in case judged as Yes in Step S20), the load management unit 364 inquires of the RNC 200 via the network communication unit 350 a received power status (whether the received power concerned exceeds a threshold value) of the pilot signal of the base station 2 in a mobile station (the mobile station 101 in FIG. 1, for example) which exists around the cell 12 (Step S21). In case the received power concerned exceeds the threshold value (in case judged as Yes in Step S21), because the network communication unit 350 receives from the RNC 200 a notice to the effect that received power of the pilot signal of the base station 2 in the mobile station exceeds the threshold value, it outputs the notification to the state change control unit 358. As a result, the state change control unit 358 issues a direction to keep an operation state of base station 2 in the active state St_11 (Step S29). On the other hand, in case the received power concerned is lower than the threshold value (in case judged as No in Step S21), because the network communication unit 350 receives from the RNC 200 a notice to the effect that received power of the pilot signal of the base station 2 in the mobile station does not exceed the threshold value, it outputs the notification to the state change control unit 358. As a result, the state change control unit 358 issues a direction to the power control unit 360 to lower gradually transmission power of a control signal including the pilot signal. The power control unit 360 which received the direction to lower transmission power outputs a direction to lower gradually transmission power of the transmission signal processing unit 356 (Step S22).

While the transmission signal processing unit 356 is lowering transmission power by control of the power control unit 360, the base station 2 carries out processing described in Step S23 and Step S24 repeatedly. The reception signal processing unit 354 confirms whether a new connection request from the mobile station in the cell 12 of own base station exists (Step S23). The network communication unit 350 receives from the RNC 200 periodically received power status of the base station 2 in the mobile station, and confirms it (Step S24). In case a new connection request exists from the mobile station in the cell 12 while lowering transmission power (in case judged as Yes in Step S23) or a notification is received from the RNC 200 to the effect that received power of the pilot signal of the base station 2 in the mobile station which is in communication with other base station (the mobile station 101 in FIG. 1, for example) exceeds a threshold value (in case judged as Yes in Step S24), at least one of the reception signal processing unit 354 and the network communication unit 350 outputs to the state change control unit 358 control information or a direction to make transmission power rise to a prescribed value. By this control information or the direction, the state change control unit 358 issues a direction to the power control unit 360 to make transmission power of a control signal including the pilot signal in the transmission signal processing unit 356 rise to a prescribed value. As a result, the power control unit 360 controls the transmission signal processing unit 356, makes transmission power rise (Step S28), and keeps an operation state of the base station 2 in the active state St_11 (Step S29).

On the other hand, in case no new connection requests exist from the mobile station in the cell 12 while lowering transmission power (in case judged as No in Step S23) and the base station 2 does not receive a notification from the RNC 200 to the effect that a received power of the pilot signal of the base station 2 in the mobile station which is in communication with other base station exceeds a threshold value (in case judged as No in Step S24), the transmission signal processing unit 356 judges whether transmission power is lowered to a predetermined threshold value (Step S25). At the time when being lowered to the threshold value, the transmission signal processing unit 356 notifies the state change control unit 358 and further, the state change control unit 358 reports to the RNC 200 via the network communication unit 350 to the effect that the base station 2 changes to the radio transmission suspension state St_12 (Step S26). After reporting state change to the RNC 200, the state change control unit 358 issues a direction to the power control unit 360 to suspend transmission of the pilot signal of the transmission signal processing unit 356 (Step S27). As a result, an operation state of the base station 2 becomes the radio transmission suspension state St_12.

Further, transmission power lowering processing of the base station 2 is not limited to the above. For example, the power control unit 360 or the transmission signal processing unit 356 of the base station 2 can lower transmission power to a predetermined value not gradually but quickly. In that case, at least processing of Step S23, and depending on the case, processing of Step S24 in FIG. 6 can also be omitted. Here, "predetermined value" mentioned above includes a state when a signal is not outputted at all, that is, power "0" ("0" watt, for example).

Figure 7:
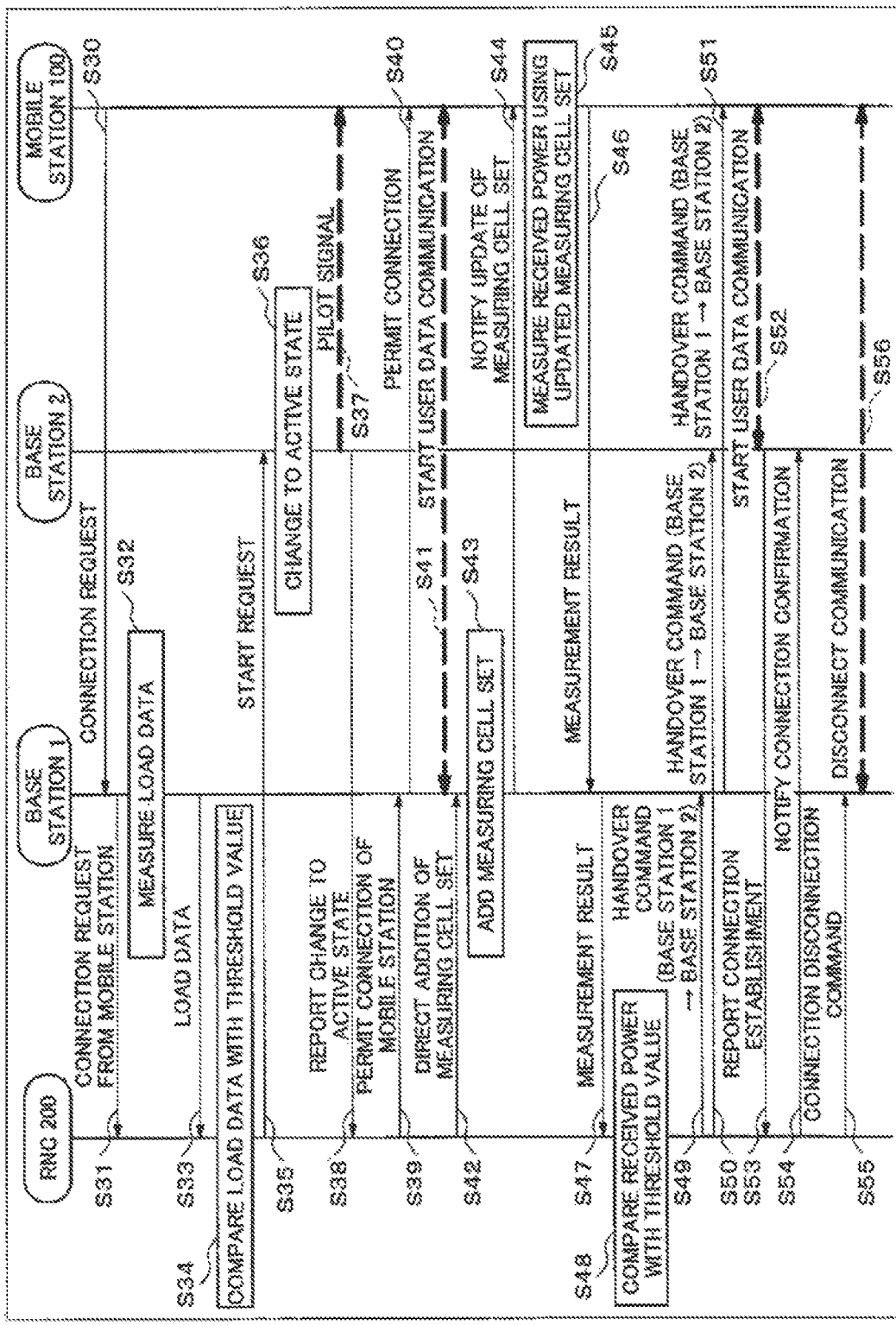

FIG. 7 is a sequence chart showing an example of operation, of the radio communications system in the first exemplary embodiment on the occasion when the second base station changes from a radio transmission suspension state to an active state and hands over a mobile station which are accommodated in the first base station to the second base station.

Here, the mobile station 100 is supposed to communicate first with the base station 1 newly.

In the neighborhood of the base station 2 which is in the radio transmission suspension state St_12, the mobile station 100 transmits a connection request concerning an outgoing call and so on to the base station 1 in the neighborhood of the base station 2 (Step S30). The base station 1 which received the connection request of the mobile station 100 notifies the RNC 200 that the mobile station 100 issued the connection request (Step S31). The base station 1 measures load based on traffic amount and so on of own base station (Step S32). The base station 1 transmits measured load data to the RNC 200. (Step S33). The RNC 200 compares the load data of the base station 1 with a predetermined threshold value (Step S34).

In case the load data exceeds the threshold value (in other words, in case load of the base station 1 is heavy), the RNC 200 transmits a start request to the base station 2 (Step S35). The base station 2 which received the start request from the RNC 200 makes an operation state change from the radio transmission suspension state St_12 to the active state St_11 (Step S36). The base station 2 which changed to the active state St_11 starts transmission of a control signal including the pilot signal with prescribed transmission power (Step S37). The base station 2 which started transmission of the pilot signal reports (start report) to the RNC 200 that it changed to active (Step S38).

The RNC 200 which received the start report from the base station 2 issues a connection permission notification to the base station 1 to the effect that the base station 1 and the mobile station 100 are permitted to connect (Step S39). The base station 1 which received the connection permission notification from the RNC 200 issues the connection permission notification to the mobile station 100 (Step S40). The mobile station 100 which obtained the connection permission from the base station 1 starts communication of user data (main information of communication (sound or data, for example)) with the base station 1 (Step S41).

Also, the RNC 200 directs to add the cell 12 of the base station 2 to the measurement cell set of the base station 1 concurrently with Step S39 (Step S42). The base station 1 which received from the RNC 200 the addition direction to the measurement cell set adds the base station 2 to the measurement cell set (Step S43) and notifies the mobile station which is in communication of update of the measurement cell set (Step S44).

The mobile station 100 which received from the base station 1 the update notification of the measurement cell set measures received power of the pilot signal which is transmitted from the base stations (the base station 1 and the base station 2 in FIG. 1, for example) registered within the new measurement cell set (Step S45). And the measurement result is transmitted to the base station 1 (Step S46). The base station 1 transmits the measurement result received from the mobile station 100 to the RNC 200 (Step S47). The RNC 200 which received the measurement result compares received power of the base station 2 in the mobile station 100 with a threshold value (Step S48). At that time, when the received power of the pilot signal of the base station 2 is higher than the threshold value, the RNC 200 notifies the base station 1 and the base station 2 respectively, of a command to the effect that the mobile station 100 is handed over from the base station 1 to the base station 2 (Step S49 and Step S50).

The base station 1 which received the handover command concerned from the RNC 200 issues to the mobile station 100 a command to the effect that communication is handed over to the base station 2 (Step S51). The base station 2 hands over communication of the mobile station 100 from the base station 1, and starts user data communication with the mobile station 100 (Step S52). The base station 2 reports to the RNC 200 to the effect that a connection is established with the mobile station 100 (Step S53). The RNC 200 notifies the base station 2 to the effect that the connection establishment is confirmed (Step S54). The RNC 200 commands the base station 1 to disconnect communication with the mobile station 100 (Step S55). The base station 1 which received the communication disconnect command disconnects communication with the mobile station 100 (Step S56).

By the processing mentioned above, handover processing of the mobile station 100 from the base station 1 to the base station 2 ends.

Further, in Step S48, in case received power of the base station 2 is lower than the threshold value, the RNC 200 commands the base station 2 to call a flow (shown in FIG. 6) which changes to the radio transmission suspension state. St_12. The base station 2 which received the command concerned operates based on the calling condition (3) of a flow to change from the active state St_11 to the radio transmission suspension state St_12 mentioned above.

Figure 8:
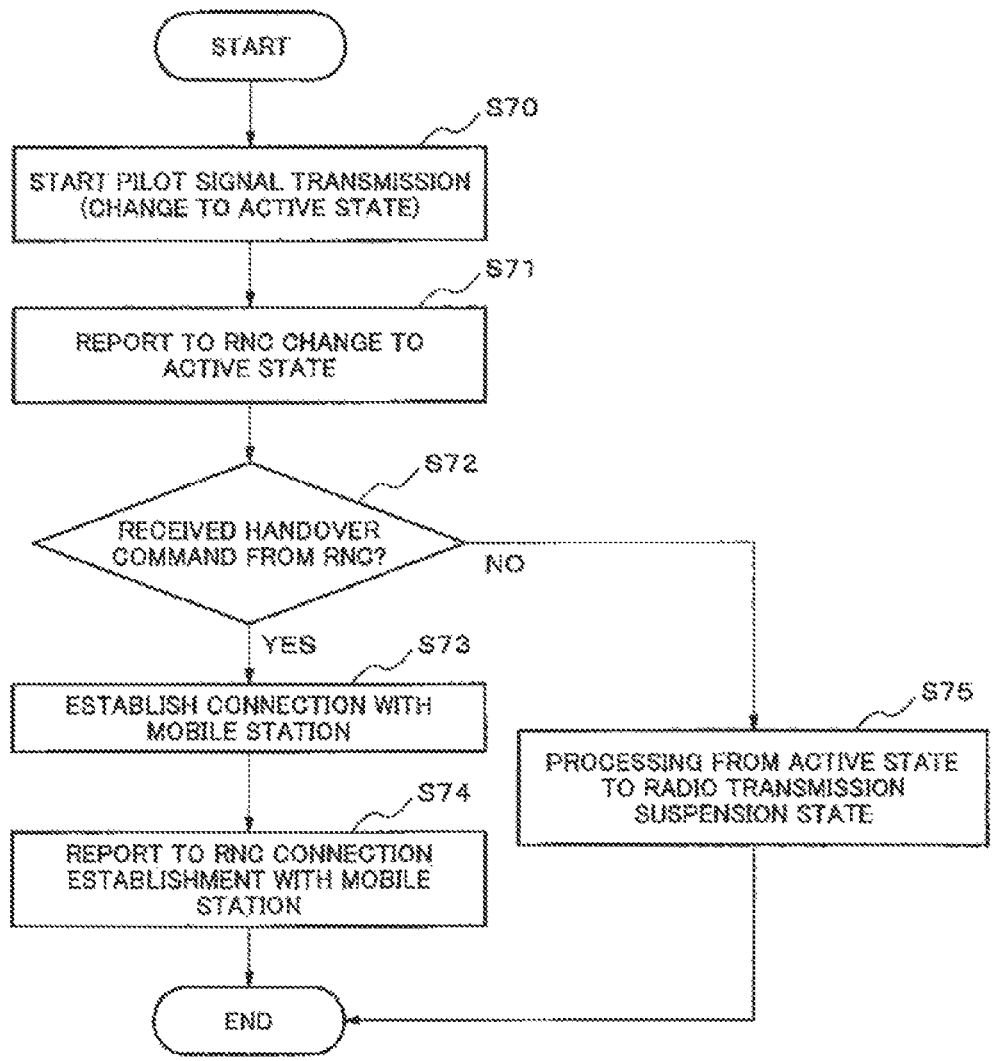

FIG. 8 is a flow chart showing an example of operation of the second base station in the first exemplary embodiment on the occasion when the second base station changes from a radio transmission suspension state to an active state and hands over a mobile station which are accommodated the first base station to the second base station.

The base station 2 in the radio transmission suspension state St_12 starts change from the radio transmission suspension state St_12 to the active state St_11 by receiving a start request from the RNC 200 after the mobile station 100 transmitted a connection request to the base station 1.

The network communication unit 350 of the base station 2 which received the start request from the RNC 200 outputs the start request to the state change control unit 358. As a result, the state change control unit 358 issues a direction to make an operation state of the base station 2 change from the radio transmission suspension state St_12 to the active state St_11. By the direction of the state change control unit 358, the power control unit 360 issues a direction to make transmission power of a control signal including the pilot signal in the transmission signal processing unit 356 increase to a prescribed value. As a result, transmission of the pilot signal from the base station 2 starts (Step S70). After starting transmission of the pilot signal, the transmission signal processing unit 356 of the base station 2 reports (start report) to the RNC 200 via the network communication unit 300 that it changed to the active state (Step 71).

Next, the transmission signal processing unit 356 of the base station 2 confirms with the network communication unit 350 whether a handover command is received from the RNC 200 (Step S72).

When the handover command is received (in case of Yes in Step S72), the transmission signal processing unit 356 and the reception signal processing unit 354 establish a connection with the mobile station 100 and start user data communication (Step S73). The transmission signal processing unit 356 reports to the RNC 200 via the network communication unit 350 to the effect that the connection between the base station 2 and the mobile station 100 is established (Step S74). By reporting to the RNC 200 that the base station 2 and the mobile station 100 have started user data communication, processing shown in this flow (that is, processing to make change from the radio transmission suspension state St_12 to the active state St_11, and to handover a mobile station which the base station 1 accommodates to the base station 2) ends.

Further, in case there are no handover commands (in case judged as No in Step S72), the state change control unit of the base station 2 judges that the base station 2 and the mobile station 100 cannot communicate or enough quality cannot be secured even if they can communicate. Accordingly, because the meaning is lost to keep the active state St_11 concerning communication with this mobile station 100, the base station 2 carries out processing to return the operation state of the base station 2 from the active state St_11 to the radio transmission suspension state St_12 (Step S75). Because this change processing is already described using FIG. 6, its description will be omitted.

In the radio communications system according to the first exemplary embodiment described above, the base station 2 is characterized by, in the radio transmission suspension state, when communication between the base station 1 and the mobile station 100 is started (specifically, when the mobile station 100 performs a connection request to the base station 1) and a predetermined condition is satisfied, starting transmission of the pilot signal with predetermined power.

That is, when communication is started between the mobile station 100 and the base station 1 as the first base station (that is, a mobile station having possibility to be a handover target exists) and a predetermined condition is satisfied (in case load of the base station 1 is heavy, for example), the base station 2 as the second base station, for the first time at that point, starts transmission of the pilot signal to the mobile station 100 (that is, it changes from the radio transmission suspension state St_12 to the active state St_11).

Specifically, the base station 2 includes: a means (the network communication unit 350, for example) which receives a start request transmitted from other equipment when communication between the base station 1 and the mobile station 100 is started and a predetermined condition is satisfied, and a means (the state change control unit 358 and the power control unit 360, for example) which starts transmission of the pilot signal with predetermined power based on the start request.

Thus, in case of the radio communications system of the first exemplary embodiment, only in case a mobile station with high possibility of handover from an adjacent base station to own base station exists for certain, own base station can be set to the active state St_11. Accordingly, for example, returning to an active state wastefully like Japanese Patent Application Laid-Open No. 2003-37555 is avoided, and as a result, it becomes possible, with more certainty, to suppress consumption of electric power of the base station and avoid radio interference between the base stations.

Further, the base station 2 of the radio communications system according to the first exemplary embodiment judges, in case there are no handover commands from the RNC 200 after changing to the active state St_11, that a mobile station which communicates with the base station 2 does not exist, the base station 2 and the mobile station 100 cannot communicate, or enough quality cannot be secured even if they can communicate. And in that case, the base station 2 judges that the meaning to keep the active state St_11 concerning communication with this mobile station 100 is lost and carries out processing to return the operation state of the base station 2 from the active state St_11 to the radio transmission suspension state St_12.

That is, the base station 2 includes a means to suspend transmission of the pilot signal (the state change control unit 358 and the power control unit 360, for example) after it has started transmission of the pilot signal, in case a mobile station which communicates with the base station 2 does not exist, the base station 2 and a mobile station cannot communicate, or enough quality cannot be secured even if they can communicate.

By performing more careful state change control as above, it becomes possible, with more certainty, to suppress consumption of electric power of the base station and avoid radio interference between the base stations.

Further, in the description mentioned above, a case for one second base station (that is, a base station which changes between the radio transmission suspension state St_12 and the active state St_11 appropriately, specifically the base station 2 in FIG. 1) is given as an example. However, number of second base stations may be plural. When a case is assumed where second base stations exist in plural, according to control described in Japanese Patent Application Laid-Open No. 2003-37555, all second base stations return to the active state St_11 and those other than the base station which is in communication with a mobile station keep the active state wastefully. In case of the present exemplary embodiment, there is also a possibility that all second base stations may be in the active state St_11 once. However, because a second base station which did not receive a handover command from other equipment (the RNC 200, for example) changes to the radio transmission suspension state St_12 immediately, different from Japanese Patent Application Laid-Open No. 2003-37555, improvement effect of power consumption reduction and avoidance of radio interference can be obtained.

Further, in the first exemplary embodiment mentioned above, although "communication traffic" of the base station 1 was given as an example of the load data of the base station 1, the load data is not limited to communication traffic. The load data can, for example, be made as "number of mobile stations in connection" of the base station 1. It is also possible to adopt both "communication traffic information" and "information of number of mobile stations in connection" as load data.

Also, in the first exemplary embodiment mentioned above, sequence of processing (specifically, processing of Steps S39-S41 in FIG. 7) in which the mobile station 100 which obtained connection permission from the base station 1 (the first base station) starts communication of user data with the base station 1 is not limited to the sequence shown in FIG. 7. For example, the user data communication start processing concerned may be performed before processing in which the base station 2 (the second base station) changes to the active state St_11 (Step S36) or may be performed after processing in which the base station 1 adds the base station 2 to the measurement cell set (Step S43). As an example of a case to perform starting of the user data communication concerned before processing in which the base station 2 changes to the active state St_11, for example, a case to perform starting of the user data communication concerned before load measurement of the base station 1 (Step S32) is performed can be given as an example. In this case, because communication of user data has already been started, the base station 1 can perform more correct load measurement. Or, starting of the user data communication concerned may be performed after processing to transmit a start request from the RNC 200 to the base station 2 (Step S35). As a result, it becomes possible to reduce connection delay. On the other hand, as an example of a case to perform starting of the user data communication concerned after processing in which the base station 1 adds the base station 2 to the measurement cell set, for example, a case to perform it after update notification processing (Step S44) of the measurement cell set from the base station 1 to the mobile station (for example, the mobile station 101 in FIG. 1) in communication with the base station 1 concerned can be given as an example.

Second Exemplary Embodiment

Hereinafter, a radio communications system according to the second exemplary embodiment of the present invention is described. The entire structure of this radio communications system is identical with the radio communications system of the first exemplary embodiment shown in FIG. 1. However, in case of the second exemplary embodiment, it is supposed that, in FIG. 1, the base station 1 as the first base station is replaced by the base station 4 described below. The difference of the second exemplary embodiment from the first exemplary embodiment exists in a structure of the first base station. Hereinafter, a base station as the first base station in the radio communications system of the second exemplary embodiment is newly referred to as a base station 4. Accordingly, a base station corresponding to the second base station in this radio communications system remains as the base station 2 of the first exemplary embodiment (refer to FIG. 3).

Figure 9:
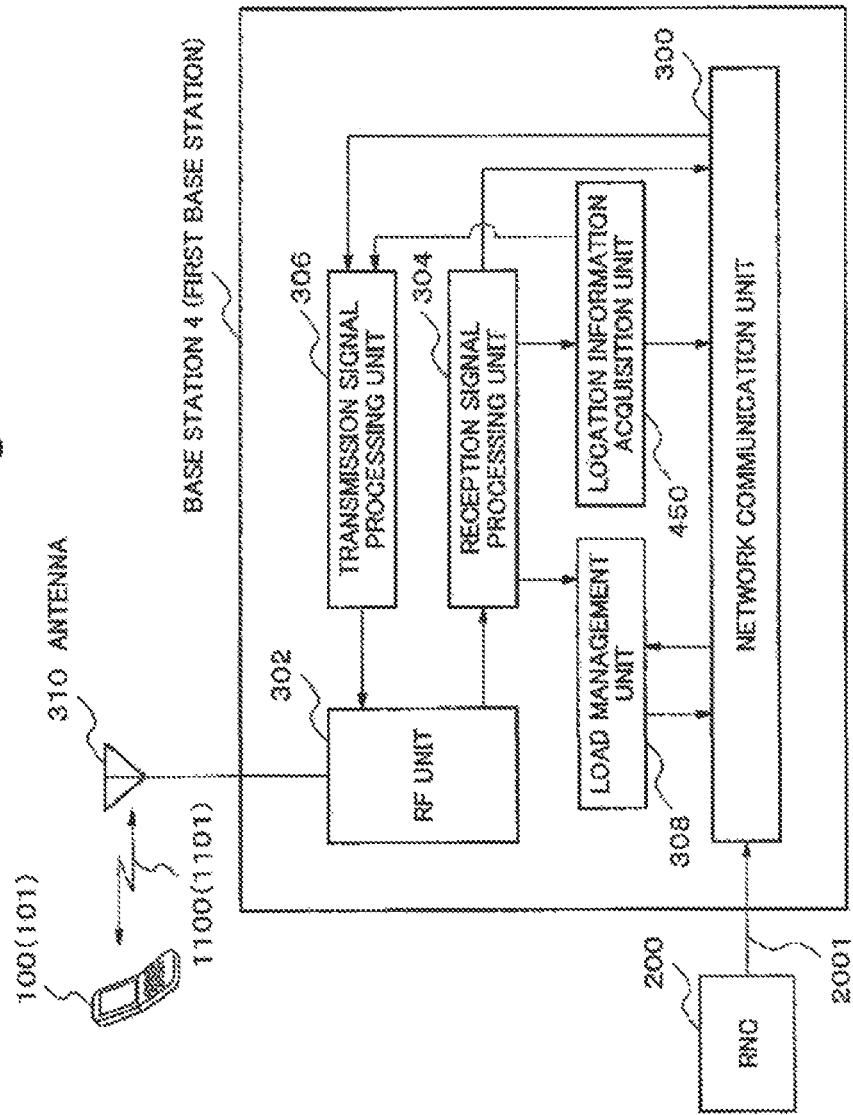

FIG. 9 is a block diagram showing an example of the base station 4 as the first base station of the second exemplary embodiment. The base station 4 further includes a location information acquisition unit 450 in addition to a structure included in the base station 1 as the first base station in the first exemplary embodiment shown in FIG. 2. Because a structure and an operation of other components (that is, a network communication unit 300, a RF unit 302, a reception signal processing unit 304, a transmission signal processing unit 306, a load management unit 308 and an antenna 310) are the same as the base station 1, their description will be omitted. The location information acquisition unit 450 acquires or detects location of a mobile station residing in the cell 11 of the base station 4 based on information obtained from the reception signal processing unit 304.

Further, in the radio communications system of this second exemplary embodiment and a radio communications system of the third exemplary embodiment described thereafter, operation sequence of the radio communications system in case the second base station changes from the active state to the radio transmission suspension state is the same as operation sequence of the radio communications system in the first exemplary embodiment (refer to FIG. 5). Also, in the radio communications system of this second exemplary embodiment and the radio communications system of the third exemplary embodiment described thereafter, an operation flow of the second base station in case of change from the active state to the radio transmission suspension state is the same as the operation flow of the second base station (refer to FIG. 6). Accordingly, hereinafter, description about the operation sequence mentioned above and the operation flow mentioned above will be omitted. Also, in the radio communications system of this second exemplary embodiment and a radio communications system of the third exemplary embodiment described thereafter, because an operation flow in case the second base station changes from the radio transmission suspension state St_12 to the active state St_11 is also the same as an operation flow of the second base station in the first exemplary embodiment (refer to FIG. 8), hereinafter, its description will also be omitted.

Figure 10:
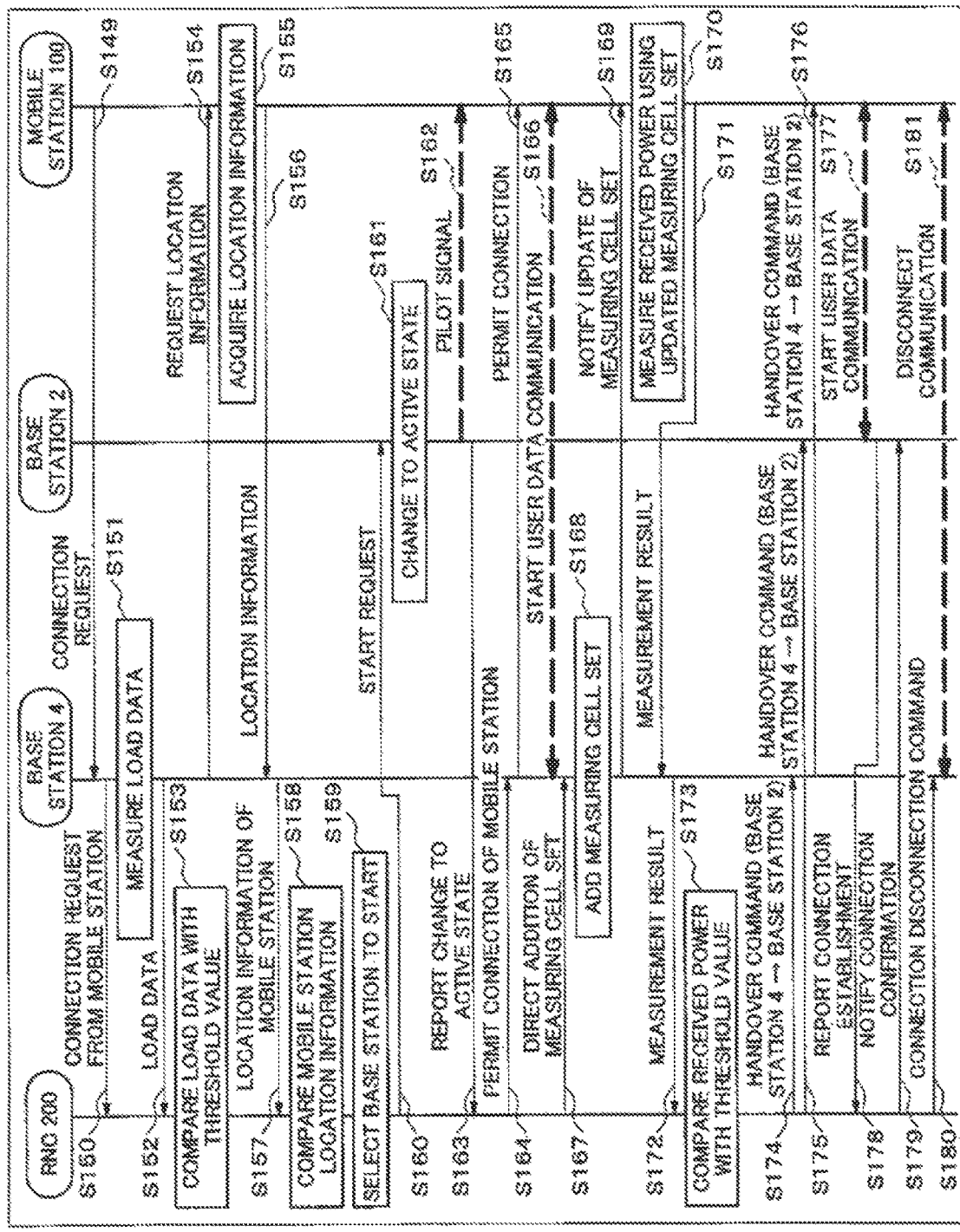

FIG. 10 is a sequence chart showing an example of operation of the radio communications system in the second exemplary embodiment on the occasion when the second base station changes from a radio transmission suspension state to an active state and hands over a mobile station which are accommodated in the first base station to the second base station. In case of this exemplary embodiment, as a condition to change state of the base station 2 from the radio transmission suspension state St_12 to the active state St_11, load data between the mobile station 100 and the base station 4 and location information of the mobile station are used.

In the neighborhood of the base station 2 which is in the radio transmission suspension state St_12, the mobile station 100 (refer to FIG. 1) transmits a connection request to the base station 4 (though described as the base station 1 in FIG. 1, hereinafter, considered as the base station 4 as mentioned above) in the neighborhood of the base station 2 (Step S149). The base station 4 which received the connection request of the mobile station 100 notifies the RNC 200 that the mobile station 100 issued the connection request (Step S150). The base station 4 measures load data of own base station (Step S151). The base station 1 transmits measured load data to the RNC 200 (Step S152). The RNC 200 compares the load data of the base station 4 with a predetermined threshold value (Step S153). Also, after transmitting the load data, the base station 4 requests location information of the mobile station 100 to the mobile station 100 (Step S154). The mobile station 100 which received the location information request from the base station 4 acquires location information using a location information acquisition means (GPS (Global Positioning System), for example) (Step S155). The mobile station 100 which acquired the location information transmits the location information to the base station 4 (Step S156). The base station 4 which acquired the location information of the mobile station transmits the location information of the mobile station 100 to the RNC 200 (Step S157).

Next, processing in case load data of the base station 4 is judged in Step S153 to be higher than a threshold value is described. In this case, the RNC 200 compares, using location information of the mobile station 100, location relationship between the mobile station 100 and an area possible to communicate with the base station 2 (the cell 12 in FIG. 1) which is at present in the radio transmission suspension state St_12 and, when it becomes the active state St_11, is to be registered within the measurement cell set of the base station 4 (Step S158). As a result of location relationship comparison, in case the base station 2 which can communicate with the mobile station 100 (a mobile station which transmitted a connection request to the base station 4 in the neighborhood of the base station 2) is found, the RNC 200 determines this base station 2 as a base station to start (Step S159). Accordingly, the RNC 200 transmits a start request to the base station 2 (Step S160). The base station 2 which received the start request from the RNC 0.200 makes an operation state change from the radio transmission suspension state St_12 to the active state St_11 (Step S161). The base station 2 which changed to the active state St_11 starts transmission of a control signal including the pilot signal with prescribed power (Step S162). The base station 2 which changed to the active state reports (start report) to the RNC 200 that it changed to the active state (Step S163). The RNC 200 which received information to the effect that the base station 2 changed to the active state issues a connection permission notification to the base station 4 to the effect that the base station 4 and the mobile station 100 are permitted to connect (Step S164). The base station 4 which received the connection permission notification from the RNC 200 issues the connection permission notification to the mobile station 100 (Step S165). As a result, user data communication is started between the base station 4 and the mobile station 100 (Step S166).

After transmitting user data communication permission with the mobile station 100 to base station 4, the RNC 200 directs the base station 4 to add the cell 12 of the base station 2 to a measurement cell set of the base station 4 (Step S167). The base station 4 which received the direction adds the cell 12 to the measurement cell set (Step S168) and notifies the mobile station which is in communication of update of the measurement cell set (Step S169).

The mobile station 100 which received the update notification of the measurement cell set from the base station 4 measures the pilot signal received power which is transmitted from the base stations (for example, the base station 4 and the base station 2 in FIG. 1) registered within the new measurement cell set (Step 170). The measurement result is transmitted to the base station 4 (Step S171). The base station 4 transmits the measurement result received from the mobile station 100 to the RNC 200 (Step S172). The RNC 200 which received the measurement result compares received power of the base station 2 in the mobile station 100 with the threshold value (Step S173). In case the received power of the base station 2 is higher than the threshold value, the RNC 200 notifies the base station 4 and the base station 2 respectively, of a command to the effect that the mobile station 100 is handed over from the base station 4 to the base station 2 (Step S174 and Step S175).

The base station 4 which received the handover command concerned from the RNC 200 issues to the mobile station 100 a command to the effect that communication is handed over to the base station 2 (Step S176). The base station 2 hands over communication of the mobile station 100 from the base station 4, and starts user data communication with the mobile station 100 (Step S177). The base station 2 reports on the RNC 200 about connection establishment with the mobile station 100 (Step S178).

The RNC 200 notifies the base station 2 a confirmation of connection establishment based on this report (step S179). The RNC 200 commands the base station 4 to disconnect communication with the mobile station 100 (Step S180). The base station 4 which received communication disconnect command disconnects communication with the mobile station 100 (Step S181).

By the processing mentioned above, handover processing of the mobile station 100 from the base station 4 to the base station 2 ends.

As described above, the second exemplary embodiment can, by using load data of the base station 4 and location information of the mobile station, select the base station to start (that is, to change from the radio transmission suspension state St_12 to the active state St_11) without waste and efficiently. That is, when load of the base station 4 as the first base station is light, the base station 2 as the second base station can keep the radio transmission suspension state St_12, and also by using location information of the mobile station, not only leveling of traffic between the base stations is achieved but also radio interference to other communication and wasteful power consumption are suppressed. In this case, a base station which accommodates a lot of mobile stations can be started by priority around the base station in the radio transmission suspension state regardless of order of a connection request or connection of a mobile station.

Here, in FIG. 1, the mobile station 100 resides in the cell 12 which is within a range possible to communicate with the base station 2. Accordingly, by starting the base station 2, the mobile station 100 can be accommodated by the base station 2. However, the mobile station 101 is located in a place where the base station 2 can not be used. Accordingly, even if the mobile station 101 enters newly cell 11 of the base station 4 and requests connection, and load of the base station 4 increases as a result, it is not possible to handover to the base station 2 and to accommodate the mobile station 101. That is, load of the base station 4 can not be reduced. This exemplary embodiment may resolve this problem as follows.

That is, when load of the base station 4 exceeds a threshold value by a connection request from the mobile station 101, the RNC 200 detects location of all mobile stations which are in connection with the base station 4 and searches out a mobile station that exists in the cell 12 of the base station 2 from among those mobile stations. In case no smaller than one mobile station which is in connection with the base station 4 and resides in the cell 12 exists, the RNC 200 starts the base station 2, and hands over at least one mobile station which is in connection with the base station 4 and resides in the cell 12 from the base station 4 to the base station 2. Thus, load of the base station 4 can be reduced.

Also, concerning acquisition and detection of location information of a mobile station, for example, information of GPS (Global Positioning System), information of AGPS (Assisted GPS) which measures location by GPS and information of a base station or information of AFLT (Advanced Forward Link Trilateration) and so on can be used.

Figure 11:
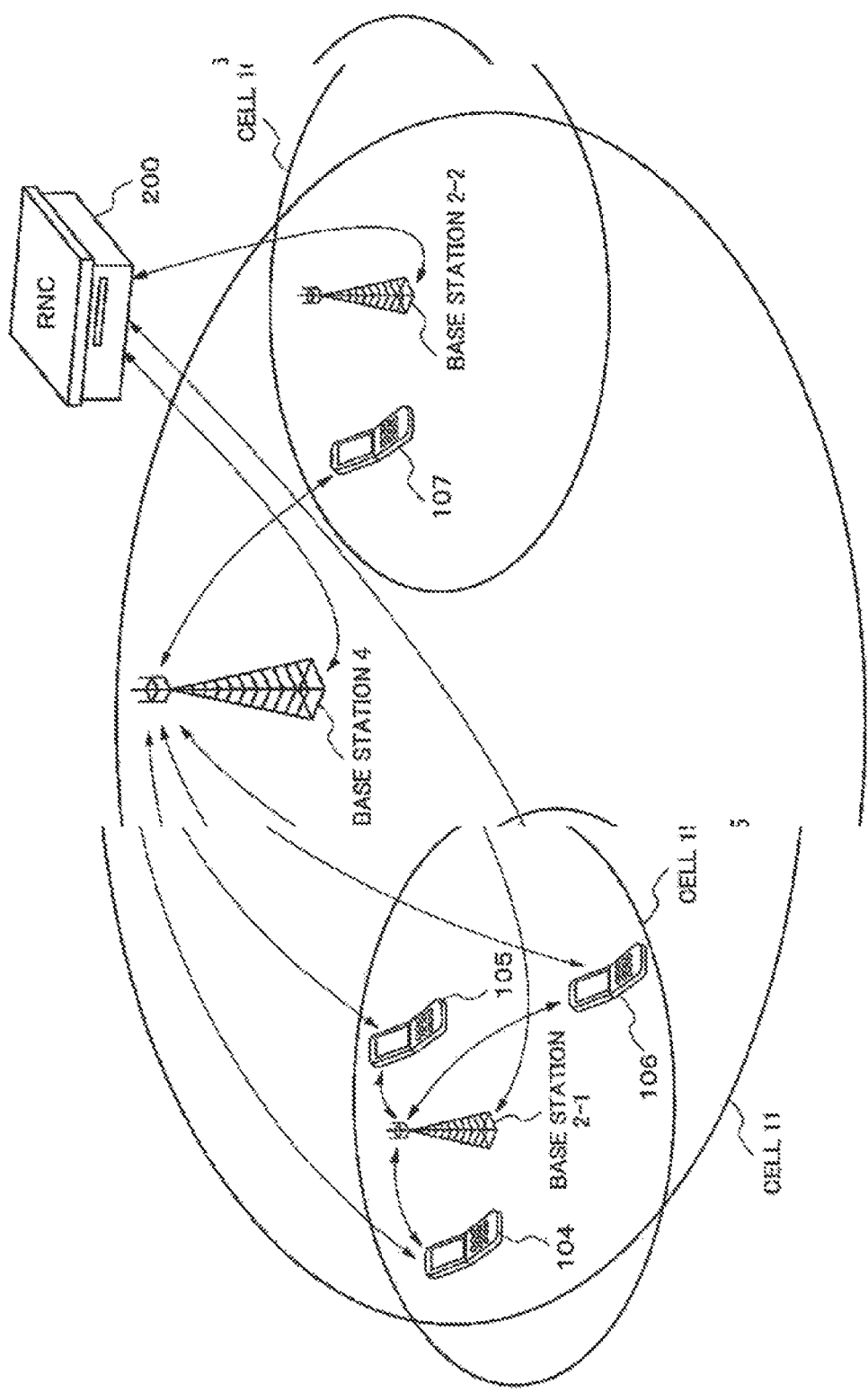

Also, as another modification example of the second exemplary embodiment, description is made with reference to FIG. 11. In FIG. 11, a base station 2-1 and a base station 2-2 as the second base station are at present in the radio transmission suspension state St_12. And for example, suppose a case where three mobile stations 104-106 located in a cell 15 of the base station 2-1 issue a connection request to the base station 4 as the first base station and one mobile station 107 located in a cell 16 of the base station 2-2 issues a connection request to the base station 4.

In case load of the base station 4 exceeds a threshold value by these connection requests, the RNC 200 detects location of all mobile stations which are in connection with the base station 4 and finds a mobile station among those mobile stations which resides in the cell 15 of the base station 2-1 and in the cell 16 of the base station 2-2. In this case, as mentioned above, three mobile stations 104-106 reside in the cell 15 of the base station 2-1, and one mobile station 107 resides in the cell 16 of the base station 2-2. In this case, it is possible for the RNC 200, for example, in selection of base station to start in Step S159 of FIG. 10, to select, out of the base station 2-1 and the base station 2-2 which are in the radio transmission suspension state St_12, the base station 2-1 which has more residing mobile stations, to transmit a start request of Step S161 to the base station 2-1, and to start it with priority.

Also, in the second exemplary embodiment mentioned above, sequence of processing (specifically, processing of Steps S164-S166 in FIG. 10) in which the mobile station 100 which obtained connection permission from the base station 4 (first base station) starts communication of user data with the base station 4 is not limited to the sequence shown in FIG. 10. For example, the user data communication start processing concerned may be performed before processing in which the base station 2 (second base station) changes to the active state St_11 (Step S161) or may be performed after processing in which the base station 4 adds the base station 2 to the measurement cell set (Step S168). As an example of a case to perform starting of the user data communication concerned before processing in which the base station 2 changes to the active state St_11, for example, a case to perform starting of the user data communication concerned before load measurement of the base station 4 (Step S151) is performed can be given as an example. In this case, because communication of user data has already been started, the base station 4 can perform more correct load measurement. Or, starting of the user data communication concerned may be performed after processing to transmit a start request from the RNC 200 to the base station 2 (Step S160). As a result, it becomes possible to reduce connection delay. On the other hand, as an example of a case to perform starting of the user data communication concerned after processing in which the base station 4 adds the base station 2 to the measurement cell set, for example, a case to perform it after update notification processing (Step S169) of the measurement cell set from the base station 4 to a mobile station (for example, the mobile station 101 in FIG. 1) in communication with the base station 4 concerned can be given as an example.

Third Exemplary Embodiment

Figure 12:
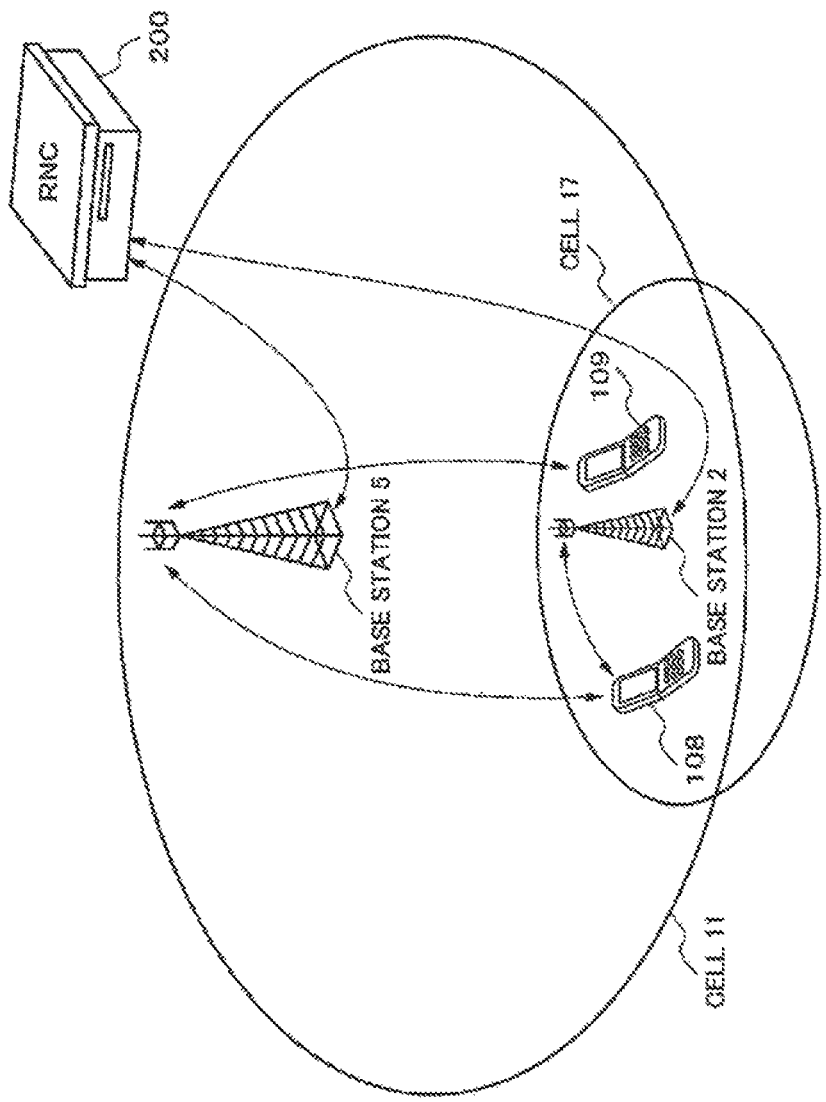

FIG. 12 is a block diagram showing an example of a radio communications system according to the third exemplary embodiment of the present invention. The radio communications system installs the base station 2 as the second base station which performs a radio transmission suspension, in the cell 11 in which a base station 5 as the first base station can communicate, as an adjacent base station of the base station 5. Here, a cell in which base station 2 can communicate is a cell 17. In this case, at least part of the cell 17 and the cell 11 overlap.

Further, in this radio communications system, the base station 5 as the first base station has the identical structure with the base station 4 of the second exemplary embodiment, and also the base station 2 as the second base station has the identical structure with the base station 2 of the first and second exemplary embodiment. Accordingly, description will be made hereafter, for the base station 5, by using a configuration of the base station 4 of FIG. 9, while for the base station 2, by using a configuration of the base station 2 shown in FIG. 3.

Also, the RNC 200 includes a relation table (not shown) which relates unique ID of a mobile station and a start target base station. When a connection request is received from a mobile station in the cell 11, the RNC 200 refers to the relation table and sets an adjacent base station (for example, the base station 2 in FIG. 12) related to the unique ID of the mobile station concerned as a base station of start target. And the mobile station concerned performs user data communication with the related adjacent base station.

Figure 13:
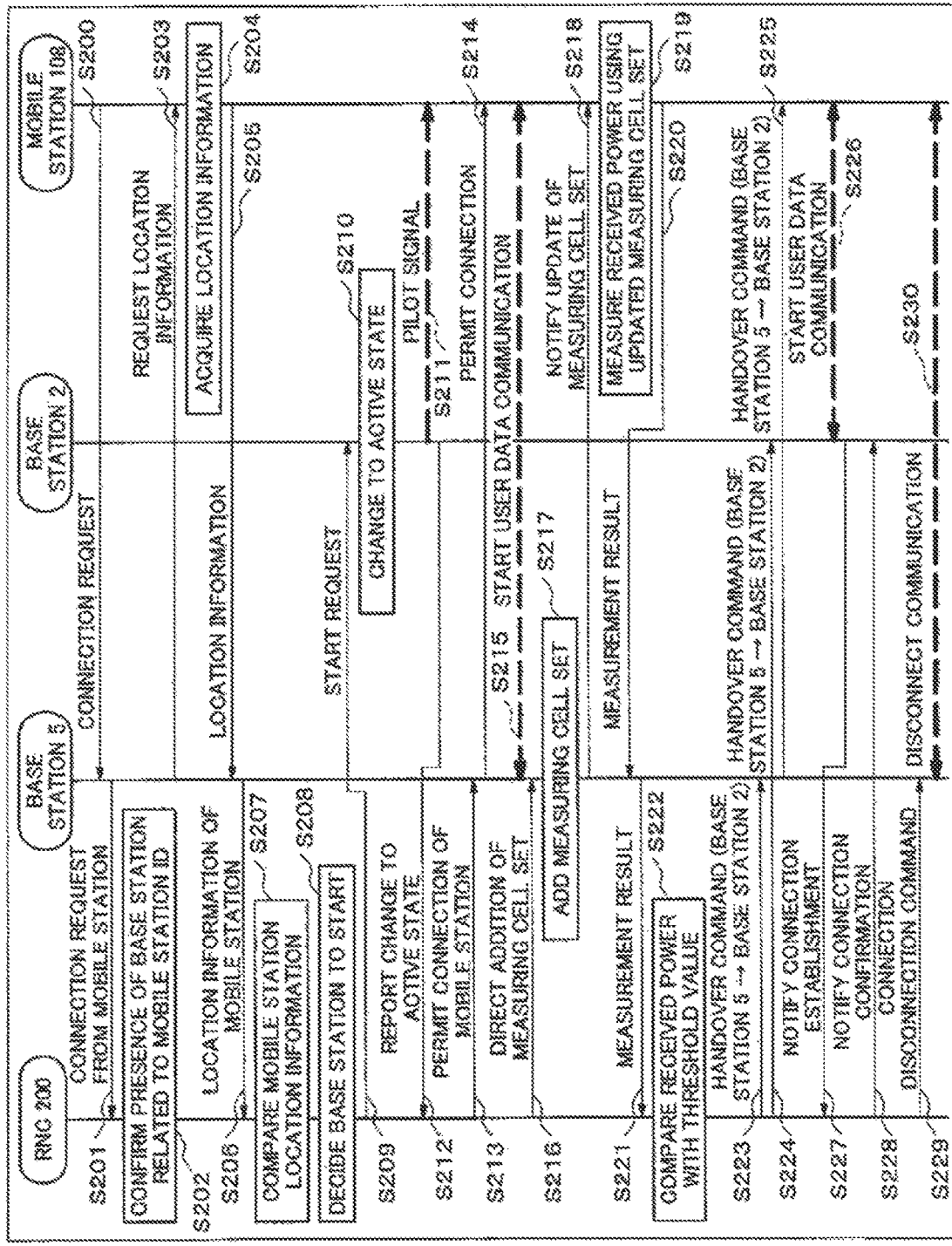

FIG. 13 is a sequence chart showing an example of operation of the radio communications system in the third exemplary embodiment on the occasion when the second base station changes from a radio transmission suspension state to an active state and hands over a mobile station which are accommodated in the first base station to the second base station.

In the neighborhood of the base station 2 which is in the radio transmission suspension state St_12, a mobile station 108 transmits a connection request to the base station 5 in the neighborhood of the base station 2 (Step S200). The base station 5 which received the connection request of the mobile station 108 notifies the RNC 200 that the mobile station 108 issued the connection request (Step S201).

The RNC 200 receives the connection request of the mobile station 108 from the base station 5 and extracts unique ID of the mobile station 108 from the received connection request. By referring to a relation table and a table of all base stations registered within a measurement cell set of the base station 5, the RNC 200 confirms a presence of a base station which is related to the extracted unique ID and is in the radio transmission suspension state (Step S202).

On the other hand, the base station 5 requests location information of the mobile station 108 to the mobile station 108 (Step S203). The mobile station 108 which received the request for location information, acquires location information by using a location information acquisition means (Step S204). The mobile station 108 which acquired the location information transmits the location information to the base station 5 (Step S205). The base station 5 which acquired the location information of the mobile station 108 transmits the location information of the mobile station 108 to the RNC 200 (Step S206).

Next, when a base station to which unique ID of the mobile station 108 is related exists in base stations registered within a measurement cell set of the base station 5 in Step S202, locations of the related base station and the mobile station are compared (Step S207). And the RNC 200 determines whether the base station is started based on unique ID of the mobile station and location information of the base station related to the ID (Step S208). Specifically, the RNC 200 judges whether the mobile station 108 resides in the cell 17 of a base station (in this case, the base station 2) which is related to unique ID of the mobile station 108 and is in a radio transmission suspension state by using location information of the mobile station 108. When the mobile station 108 resides in the cell 17 of the base station 2 which is related to the unique ID, the RNC 200 determines to start the base station 2. Accordingly, the RNC 200 transmits a start request to the base station 2 (Step S209). The base station 2 which received the start request from the RNC 200 changes an operation state from the radio transmission suspension state St_12 to the active state St_11 (Step S210). The base station 2 which changed to the active state St_11 starts transmission of a control signal including the pilot signal according to prescribed transmission power (Step S211). The base station 2 which started transmission of the pilot signal reports (start report) to the RNC 200 that it changed to the active state (Step S212).

The RNC 200 which received the start report from the base station 2 issues a connection permission notification which the base station 5 and the mobile station 108 are permitted to connect, to the base station 5 (Step S213). The base station 1 which received the connection permission notification from the RNC 200 issues connection permission to the mobile station 108 (Step S214). The mobile station 108 which obtained the connection permission from the base station 5 starts user data communication with the base station 5 (Step S215).

Also, the RNC 200 directs to add the cell 17 of the base station 2 to a measurement cell set of the base station 5 concurrently with Step S210 (Step S216). The base station 5 which received from the RNC 200 the addition direction to the measurement cell set adds the base station 2 to the measurement cell set (Step S217) and notifies the mobile station which is in communication of update of the measurement cell set (Step S218).

The mobile station 108 which received the update notification of the measurement cell set from the base station 5 measures received power of the pilot signal which is transmitted from base stations (the base station 5 and the base station 2 in FIG. 12, for example) registered within the new measurement cell set (Step S219). And the measurement result is transmitted to the base station 5 (Step S220). The base station 5 transmits the measurement result received from the mobile station 108 to the RNC 200 (Step S221). The RNC 200 which received the measurement result compares received power of the base station 2 in the mobile station 108 with a threshold value (Step S222). In case the received power of the base station 2 is higher than the threshold value, the RNC 200 notifies the base station 5 and the base station 2 respectively, of a command to the effect that mobile station 108 is handed over from the base station 5 to the base station 2 (Step S223 and Step S224).

The base station 5 which received the handover command concerned from the RNC 200 issues to the mobile station 108 a command to the effect that communication is handed over to the base station 2 (Step S225). The base station 2 hands over communication of mobile station 108 from base station 5, and starts user data communication with mobile station 108 (Step S226). The base station 2 reports on a notification that a communication is established between the mobile station 108 to the RNC 200 (step S227).

By this report, the RNC 200 sends a notification that the connection establishment is confirmed, to the base station 2 (Step S228). Further, the RNC 200 commands the base station 5 to disconnect communication with the mobile station 108 (Step S229). The base station 5 which received the communication disconnect command disconnects communication with the mobile station 108 (Step S230).

By the processing mentioned above, handover processing of the mobile station 108 from the base station 5 to the base station 2 ends.

Further, in case a mobile station 109 (refer to FIG. 12) which is not related to the base station 2 as the second base station issues a communication request to the base station 5, when it is found that a base station related to the mobile station 108 does not exist, the RNC 200 gives connection permission to the base station 5, and the mobile station 109 and the base station 5 start to communicate. In other words, the mobile station 109 which is not related to the base station 2 communicates with the base station 5 without communicating with the base station 2.

Further, according to the second and third exemplary embodiment mentioned above, although a case was given as an example where inquiries (for example, in case of the second exemplary embodiment, Step S154 of FIG. 10) are made from the first base station (for example, in case of the second exemplary embodiment, the base station 4) to a mobile station voluntarily when location information of a mobile station is acquired, it is not limited to this. The first base station may inquire location information to a mobile station, for example, after receiving a direction from the RNC 200. Also, in case location information can be acquired from a signal of a mobile station which performed a connection request, location information does not need to be inquired newly to the mobile station.

Also, in the second and third exemplary embodiment mentioned above, sequence of acquiring load data and location information of the first base station (for example, in case of the second exemplary embodiment, the base station 4) is not limited to examples of FIG. 10 (the second exemplary embodiment) or FIG. 13 (the third exemplary embodiment), and it may be replaced. Also, respective threshold values may be changed depending on load data and location information. For example, even in case load of the first base station is light, in case a mobile station exists in the neighborhood of the second base station (for example, in case of the second exemplary embodiment, the base station 2), the second base station may be started. On the other hand, even in case load of the first base station is heavy, in case the mobile station is within a communication range of the second base station, the second base station may be started.

As described above, by providing the base station related to the mobile station, the base station which communicates only with the specific mobile station can be set. That is, an emergency call and so on can be connected with priority compared with other mobile stations.

Further, in the present exemplary embodiment, information used to relate the mobile station and the base station is not limited to unique ID of the mobile station necessarily. For example, calling information (kinds of outgoing calls, for example) can be adopted as information which relates the mobile station and the base station. By relating the mobile station and the base station by calling information, in case a special outgoing call such as an emergency call is made, the outgoing call concerned can be connected with priority compared with other general outgoing calls or communication quality of the outgoing call concerned can be made of high quality compared with other general outgoing calls.

Also, in the third exemplary embodiment mentioned above, although only the base station 2 related to unique ID of a mobile station is installed, in case another base station 2 which is not related to unique ID exists, it is possible to operate similar to the third exemplary embodiment mentioned above.

Also, in the third exemplary embodiment mentioned above, sequence of processing (specifically, processing of Steps S213-S215 in FIG. 13) in which the mobile station 108 which obtained connection permission from the base station 5 (first base station) starts communication of user data with the base station 5 is not limited to the sequence shown in FIG. 13. For example, the user data communication start processing concerned may be performed before processing in which the base station 2 (second base station) changes to the active state St_11 (Step S210) or may be performed after processing in which the base station 5 adds the base station 2 to the measurement cell set (Step S217). As an example of a case to perform starting of the user data communication concerned before the base station 2 changes to the active state St_11, for example, a case to perform starting of the user data communication concerned before confirmation processing by the RNC 200 about a presence of a base station which is related to extracted unique ID and is in a radio transmission suspension state (Step S202) can be given as an example. Or, starting of the user data communication concerned may be performed after processing which transmits a start request from the RNC 200 to the base station 2 (Step S209). In this case, it becomes possible to reduce connection delay. On the other hand, as an example of a case to perform starting of the user data communication concerned after processing in which the base station 5 adds the base station 2 to the measurement cell set, for example, a case to perform it after update notification processing (Step S218) of the measurement cell set from the base station 5 to the mobile station (for example, the mobile station 109 in FIG. 12) in communication with the base station 5 concerned can be given as an example.

Other Examples of Modification

In the first to third exemplary embodiments described above, it is described that the handover of the mobile station from the first base station to the second base station is performed after starting "user data" communication between the first base station and the mobile station. However, the handover mentioned above can also be performed at a communication stage of "control signal" in which user data is not communicated.

Figure 14:
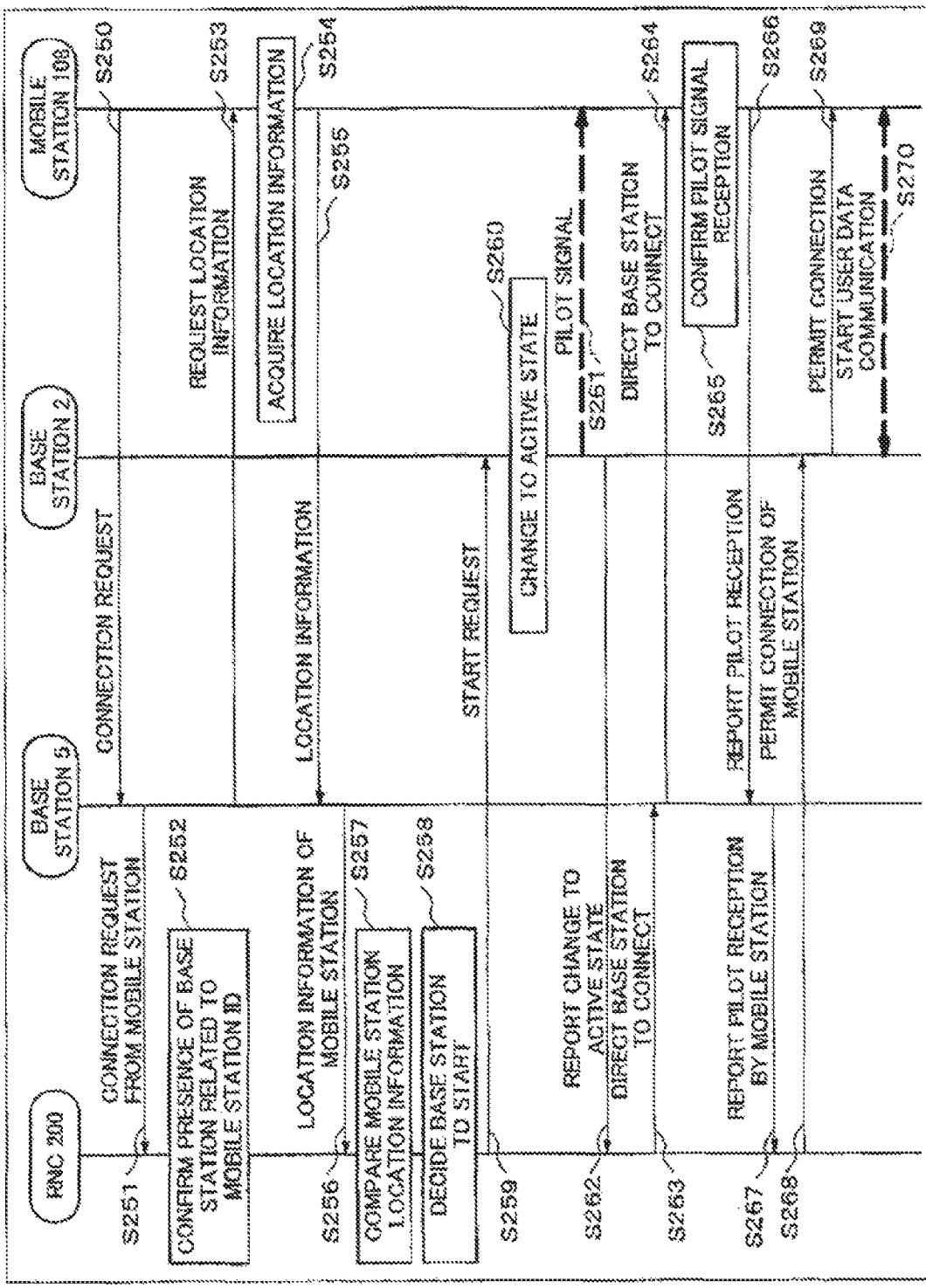

FIG. 14 is a figure describing a first method for carrying out handover processing of a control signal at a communication stage, and a sequence chart showing an example of operation of a radio communications system on the occasion when the second base station changes from a radio transmission suspension state to an active state and hands over a mobile station which are accommodated in the first base station to the second base station in the third exemplary embodiment.

Further, in FIG. 14, Step S250 (the mobile station 108 transmits a connection request to the base station 5)~Step S262 (the base station 2 changes to the active state) are common with Steps S200~S212 shown in FIG. 13, their description will be omitted.

The RNC 200 which received a start report from the base station 2 directs the mobile station 108 via the base station 5 to connect to the base station 2 (Step S263 and Step S264). The mobile station 108 which received the direction to connect to the base station 2 confirms whether the pilot signal of the base station 2 can be received (Step S265). The mobile station 108 which could confirm that the pilot signal could be received reports via the base station 5 that the pilot signal of the base station 2 could be received (Step S266 and Step S267). The RNC 200 which confirmed that the mobile station 108 could receive the pilot signal of the base station 2 transmits to the base station 2 permission to connect with the mobile station 108 (Step S268). The base station 2 which received the connection permission with the mobile station 108 transmits connection permission to the mobile station 108 (Step S269). The mobile station 108 which obtained the connection permission from the base station 5 starts user data communication with the base station 2 (Step S270).

Further, in case of starting connection with the base station 2 directly, the mobile station 108 which received Step S264 receives the pilot signal of the base station 2, and based on the pilot signal, may transmit a connection request to the base station 2 newly. At that time, the connection request which the mobile station 108 transmitted to the base station 5 is discarded after the RNC 200 transmits a connection base station direction.

Figure 15:
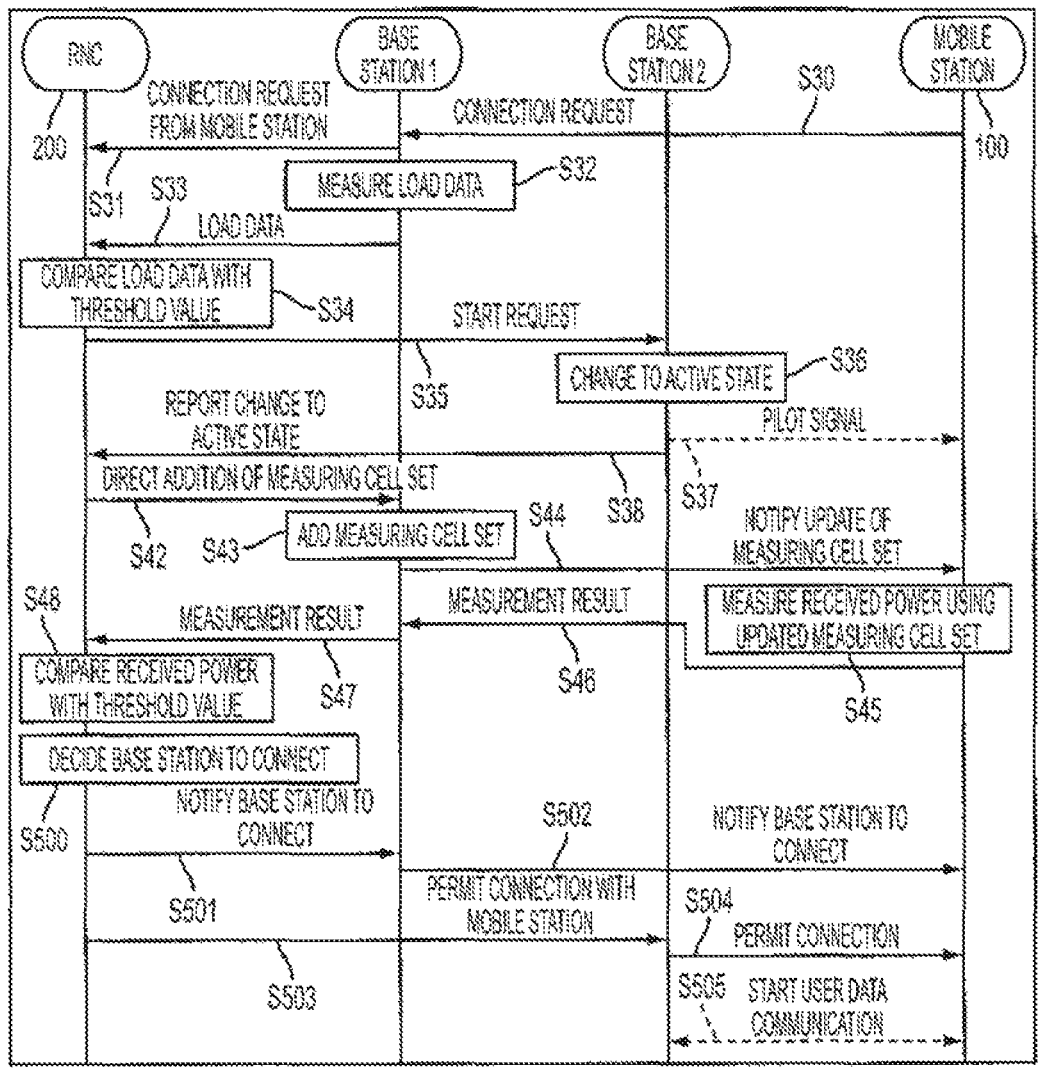

FIG. 15 is a figure describing a second method for carrying out handover processing of a control signal at a communication stage, and a sequence chart showing an example of operation of a radio communications system on the occasion when the second base station changes from a radio transmission suspension state to an active state and hands over a mobile station which are accommodated in the first base station to the second base station in the first exemplary embodiment. Further, in order to make the differences with FIG. 7 clear, in FIG. 15, processing identical with processing shown in FIG. 7 is given a step number identical with FIG. 7, and in the following description, a description of a step identical with FIG. 7 may be partly omitted.

In the neighborhood of the base station 2 which is in the radio transmission suspension state St_12, the mobile station 100 transmits a connection request (that is, "control signal") which concerns an outgoing call and so on to the base station 1 in the neighborhoods of the base station 2 (Step S30). The base station 1 notifies the RNC 200 that the mobile station 100 issued the connection request (Step S31). The base station 1 measures load based on traffic amount and so on of own base station (Step S32). The base station 1 transmits measured load data to the RNC 200 (Step S33). The RNC 200 compares the load data of the base station 1 with a predetermined threshold value (Step S34). In case the load data exceeds the threshold value, the RNC 200 transmits a start request to the base station 2 (Step S35). The base station 2 makes an operation state change from the radio transmission suspension state St_12 to the active state St_11 (Step S36). The base station 2 which changed to the active state St_11 starts transmission of the control signal including the pilot signal with prescribed transmission power (Step S37). The base station 2 which started transmission of the pilot signal reports (start report) to the RNC 200 that it changed to active (Step S38). Processing of Steps S30-S38 described above is completely the same as FIG. 7.

Here, in case of FIG. 15, processing required to start user data communication (that is, processing shown by Steps S39-S41 in FIG. 7) is omitted. That is, at this stage, only communication of the control signal alone is performed and communication of user data has not been started yet.

The RNC 200 which received the start report from the base station 2 directs to add the cell 12 of the base station 2 to the measurement cell set of the base station 1 (Step S42). The base station 1 adds the base station 2 to the measurement cell set (Step S43) and notifies the mobile station 100 in communication (communication of a control signal only) of update of the measurement cell set (Step S44). The mobile station 100 measures received power of the pilot signal which is transmitted from the base stations (the base station 1 and the base station 2 in FIG. 1, for example) registered within the new measurement cell set (Step 45). And the measurement result is transmitted to the base station 1 (Step S46). The base station 1 transmits the measurement result received from the mobile station 100 to the RNC 200 (Step S47). The RNC 200 which received the measurement result compares received power of the base station 2 in the mobile station 100 with a threshold value (Step S48). The RNC 200 determines a base station to connect based on the comparison result mentioned above (Step S500). For example, in case the received power of the pilot signal of the base station 2 is higher than the threshold value, the RNC 200 determines the base station 2 as a base station to connect. In this case, the RNC 200 notifies the base station 1 to which the mobile station 100 performed a connection request of a notification (hereinafter, referred to as a connection base station notification) which concerns this connection base station (Step S501), and the base station 1 notifies the mobile station 100 of this connection base station notification (Step S502). Further, the RNC 200 notifies the base station 2 determined as the connection base station of connection permission with the mobile station (Step 503), and the base station 2 notifies the mobile station 100 of the connection permission (Step S504). The base station 2 starts user data communication with the mobile station 100 (Step S505).

Figure 16:
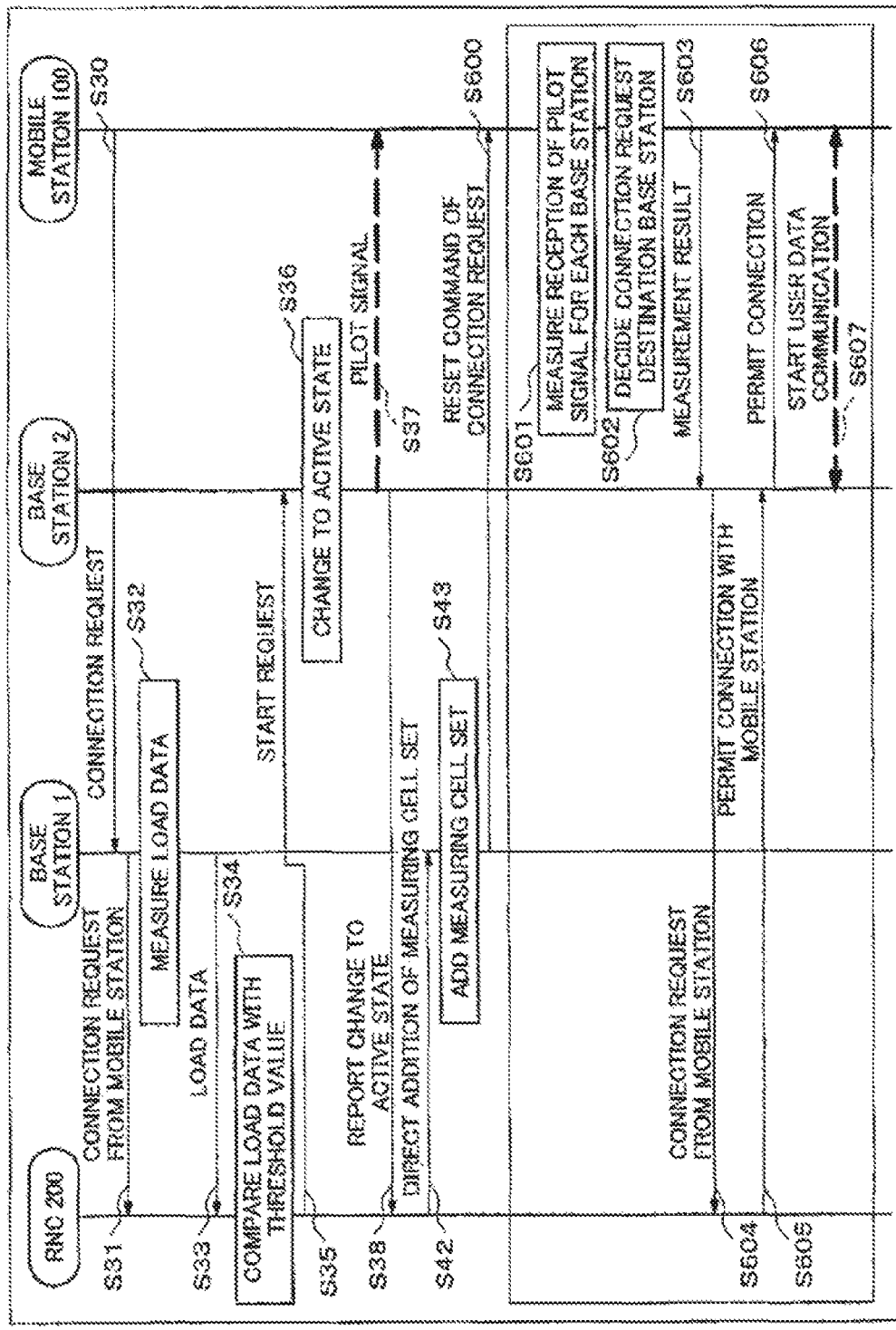

FIG. 16 is a figure describing a third method for carrying out handover processing of a control signal at a communication stage, and a sequence chart showing an example of operation of a radio communications system on the occasion when the second base station changes from a radio transmission suspension state to an active state and hands over a mobile station which are accommodated the first base station to the second base station in the first exemplary embodiment. Further, in order to make the differences with FIG. 15 clear, in FIG. 16, processing identical with processing shown in FIG. 15 is given a step number identical with FIG. 15, and in the following description, a description of a step identical with FIG. 15 may be partly omitted.

In the third method shown in FIG. 16, processing from Step S30 (processing in which mobile station 100 transmits a connection request which concerns an outgoing call and so on (that is, "control signal") to the base station 1 in the neighborhood of the base station 2) to Step S43 (processing in which the base station 1 adds the base station 2 to the measurement cell set) is identical with the second method shown in FIG. 15. The difference between the third method shown in FIG. 16 and the second method shown in FIG. 15 exists in a point that there are differences in the processing thereafter. In the third method, in case of a handover which does not involve user data communication, the base station 1 resets a connection request (that is, connection request of Step S30 in FIG. 16) from the mobile-station 100 (Step S600) and starts a connection request procedure to the base station 2 newly (Steps S601-S607). Specifically, the mobile station 100 which received a reset command of the connection request performs a reception measurement of the pilot signal of each of the base station 1 and the base station 2 (Step S601). The mobile station 100 determines a base station to which transmits a connection request from the reception measurement result of the pilot signal (Step S602). For example, in case the received power of the pilot signal of the base station 2 is higher than a threshold value, the mobile station 100 determines the base station 2 as the base station to which transmits the connection request. The mobile station 100 transmits the connection request to the base station 2 (Step S603). The base station 2 transmits the connection request from the mobile station 100 to the RNC 200 (Step S604). The RNC 200 notifies the base station 2 of connection permission with the mobile station 100 (Step S605). The base station 2 notifies the mobile station 100 of the connection permission (Step S606). The base station 2 starts user data communication with the mobile station 100 (Step S607).

In this case, the RNC 200 does not need to request a received power report (result report of power measurement using the measurement cell set) of the base stations 1 and 2 to the mobile station 100. And this can be realized in such a way as, after the base station 1 receives a direction (Step S42) from the RNC 200 to the effect that it adds the base station 2 to the measurement cell set of the base station 1, and adds the base station 2 to the measurement cell set (Step S43), to re-perform acquisition of the pilot signal (Step S45) for the second time to the mobile station 100, and to perform a connection request once again to a base station with high received power.

Further, each of the first to third methods for carrying out handover processing of a control signal at a communication stage described above can be applied to all of the first to third exemplary embodiments.

By the way, in the first to third exemplary embodiments mentioned above, a part which adds a cell of a base station which became the active state to the measurement cell set and gives a direction to a mobile station to measure the cell may be omitted. A mobile station may, by receiving the pilot signal autonomously, measuring its power, and receiving an identification signal of a cell from a control signal of the cell and so on, report the pilot received power together with an identification number of the cell.

Also, in the first to third exemplary embodiments mentioned above, although a base station and a cell are supposed to be those which correspond one to one, in case one base station has a plurality of cells, control to perform changes to the active state and the radio transmission suspension state may be performed by a cell unit.

Also, in the first to third exemplary embodiments mentioned above, the RNC 200 is not necessarily an indispensable component. For example, the first base station from which handover originates (for example, in case of the first exemplary embodiment, the base station 1) can be made to function as the RNC 200. In that case, the base station 1 and the base station 2 are connected directly, for example, via a cable communication network. Accordingly, the base station 2 as the second base station can receive, for example, "start request" (for example, in case of the first exemplary embodiment, Step S35 of FIG. 7) which is a direction for own base station to change to the active state St_11, directly from other equipment than the RNC 200, for example, from the base station 1 as the first base station.

Also, in the first to third exemplary embodiments mentioned above, the first base station (for example, in case of the first exemplary embodiment, the base station 1) may include a function (for example, in case of the first exemplary embodiment, Step S5 in FIG. 5) in which the RNC 200 compares received power with a threshold value. In that case, the base station 1 may notify the base station 2 via the RNC 200 of received power status. And a function to compare load data with a threshold value of Step S34 in FIG. 7 may be included in the base station 1. In that case, the base station 1 may request via the RNC 200 to start the base station 2.

Also, concerning processing in which the second base station changes from the active state St_11 to the radio transmission suspension state St_12, in the first to third exemplary embodiments mentioned above, it was described that the RNC 200 compares a measurement result of the mobile station (for example, the mobile station 101 in FIG. 1) which received the pilot signal of the base station 2 and performed measurement with a threshold value (Step S5) and transmits the comparison result concerned to the base station 2 (Step S6). However, the comparison processing mentioned above can be performed by the base station 2, not by the RNC 200. In that case, for example, the RNC 200 which received a received power status confirmation request from the base station 2 does not perform comparison processing and transmits the measurement result itself mentioned above (that is, received power information of the pilot signal of the base station 2 in a mobile station in communication with other base station in the neighborhood of the cell 12, for example, the mobile station 101 in communication with the base station 1 in FIG. 1) to the base station 2. The base station 2 compares the measurement result concerned with a predetermined threshold value. Here, the predetermined threshold value may be stored in advance before the comparison processing concerned, for example, in a predetermined storage means of the base station 2. Also, the threshold value can be changed dynamically depending on a predetermined condition.

Also, concerning processing in which the second base station (for example, in case of the first exemplary embodiment, the base station 2) changes from the active state St_11 to the radio transmission suspension state St_12, in the first to third exemplary embodiments mentioned above, it was described that the RNC 200 compares a measurement result of a mobile station (for example, mobile station 101 in FIG. 1) which received the pilot signal of the base station 2 and performed measurement with a threshold value (Step S5), transmits the comparison result concerned to the base station 2 (Step S6), and in case the measurement result mentioned above is below the threshold value, the base station 2 changes to the radio transmission suspension state St_12 (corresponds to processing of Steps S7-S12 of FIG. 5).

However, a condition on which the second base station changes to the radio transmission suspension state St_12 is not limited to the above. For example, the RNC 200 which received (Step S4 of FIG. 5) a received power status confirmation request from the base station 2, in case judged that a mobile station (a mobile station to which a control signal of a second base station is transmitted) in communication with the base station 1 does not exist, sets a comparison result to "measurement result is no more than a threshold value" forcibly and transmits it to the base station 2 (corresponds to Step S6 of FIG. 5). The base station 2 which received the comparison result concerned changes to the radio transmission suspension state St_12 by performing Steps S7-S12 of FIG. 5. Thus, by so doing, also in case a mobile station in communication does not exist around the base station 1 other than the mobile station which has ended communication with the base station 2, to make the base station 2 change to a radio transmission suspension state becomes possible.

Also, according to the first to third exemplary embodiments mentioned above, although it was described to handover "a mobile station which performed a connection request newly" to the first base station from the first base station to the second base station, it is also possible to handover "a mobile station already in communication with a first base station" from the first base station to the second base station. In that case, for example, in case of the first exemplary embodiment, processing is started from Step S32 in FIG. 7. Also, because communication with a mobile station is already started, Steps S39-S41 are omitted. Thereafter, processing after Step S42 of FIG. 7 is carried out, and "a mobile station already in communication with the first base station" can be handed over from the first base station to the second base station similar to "a mobile station which performed a connection request newly".

Similarly, although it was described "a mobile station which performed a connection request newly" to the first base station is handed over from the first base station to the second base station, for example, in the first exemplary embodiment, "a mobile station which was handed over to the cell 11 from a cell other than the cell 11" can be handed over from the first base station to the second base station. For example, in case of the first exemplary embodiment, it is possible to replace from Step S30 of FIG. 7 to a handover command from the RNC 200, and to replace from a connection establishment report after starting communication to Step S31. Thereafter, processing after Step S32 of FIG. 7 is performed, and "a mobile station which is a mobile station which was handed over to the cell 11 from a cell other than the cell 11" can be handed over from the first base station to the second base station similar to "a mobile station which performed a connection request newly".

Also, in the first to third exemplary embodiments mentioned above, in processing of Step 5 shown in FIG. 5 (that is, processing in which the RNC 200 compares received power and a threshold value of the second base station in a mobile station), the threshold value may be changed depending on load data of the first base station. For example, by setting up the threshold value so that handover tends to take place easier when load is heavy, it becomes easier to get the effect of load balancing.

Also, in the first to third exemplary embodiments mentioned above, processing of Step 5 shown in FIG. 5 (that is, processing in which the RNC 200 compares received power and a threshold value of the second base station in a mobile station) may be performed in the second base station. In that case, by the second base station 2 requesting received power information to the RNC 200, by the RNC 200 which received the request transmitting a measurement result of a mobile station to the second base station, and by the second base station comparing the transmitted measurement result of a mobile station with a threshold value, similar operation can be possible. Also, at that time, the RNC 200 may transmit from a result with high numerical value among measurement results in a mobile station. By transmitting from a high result, it becomes possible to complete comparison processing in the second base station (processing equivalent to step S5 which shifted to a second base station) quickly.

Also, in the first to third exemplary embodiments mentioned above, at a time of processing of Step S13 shown in FIG. 5 (that is, processing in which the RNC 200 notifies the second base station of receiving state change information), it is possible for the RNC 200 to inquire load data of the first base station (the base station 1), and in order to restrict state change of the second base station (the base station 2) and keep the active state based on the load state concerned, to reply before Step S12.

Also, in the first to third exemplary embodiments mentioned above, sequence of a start request (for example, in case of the first exemplary embodiment, processing of Step S35 in FIG. 7: transmission processing of a start request from the RNC 200 to the base station 2) and connection permission (for example, in case of the first exemplary embodiment, processing of Step S39 in FIG. 7: transmission processing of a connection permission notification with the mobile station 100 from the RNC 200 to the base station 1) does not matter. That is, just after reporting to the RNC 200 that the base station 1 received a connection request from the mobile station 100, the RNC 200 issues to the base station 1 connection permission with a mobile station, and after the base station 1 and the mobile station 100 start to communicate, the base station 2 may change to the active state St_11.

Also, sequence of the connection permission and an addition direction of the measurement cell set (Step S42 in FIG. 7: transmission processing of a direction to add the base station 2 to the measurement cell set of the base station 1) does not matter. That is, the direction to add the base station 2 to the measurement cell set may be before the base station 1 and the mobile station 100 start to communicate.

Also, in the first to third exemplary embodiments mentioned above, when a handover is performed, although only received power of the pilot signal of the base station 2 in a mobile station was used for decision criteria of handover (for example, in case of the first exemplary embodiment, Step S48 in FIG. 7), it is not limited to that. Handover may be carried out after comparison with received power of the pilot signal of the base station 1 in communication is performed. By comparing with the received power of the pilot signal of the base station 1, it becomes possible to prevent communication quality to degrade with handover.

Also, in the first to third exemplary embodiments mentioned above, it was described that the first base station (the base station 1 and the base station 4) and the second base station (the base station 2) are loaded with exclusive functions respectively, and are special purpose machines conforming to each purpose. However, by loading one base station with the function which only the other base station is loaded, the function of the first base station and the second base station is to be shared. Accordingly, by so doing, it is possible for the second base station to carry a function of the first base station which was described above, and oppositely, for the first base station to carry a function of the second base station which was described above.

Also, in the first to third exemplary embodiments mentioned above, it was described that the first base station and the second base station are controlled by special purpose hardware. However, it is also possible to make these the first base station and the second base station be controlled based on a control program by a computer circuit (CPU (Central Processing Unit), for example) which is not shown, and operate. In that case, these control programs are stored in a storage medium (such as ROM (Read Only Memory) or hard disk, for example) inside each of base station mentioned above or in an external storage medium (such as removable media or removable disk, for example), and are read out by the computer circuit mentioned above and carried out.

According to the first to third exemplary embodiments described above, it was described that the second base station makes an operation state of own base station change to the active state St_11 (in other words, start transmission of the pilot signal with predetermined power) by a start request received from other equipment (for example, the RNC 200 or the first base station). Here, the start request is a start request to the second base station based on a connection request by a mobile station to the first base station. However, the base station 2 can change to the active state St_11 autonomously not based on a direction from other equipment.

For example, the second base station receives a transmission signal, from a mobile station to the first base station, and depending on a reception condition of the transmission signal concerned, can also recognize starting of communication between the first base station and the mobile station. In this case, the second base station can recognize starting of communication between the first base station and the mobile station by measuring a received power of the transmission signal of the mobile station in upstream band to the first base station.

Also, the second base station can recognize starting of communication between the first base station and a mobile station by detecting an outgoing call of the mobile station to the first base station.

Also, the second base station can recognize starting of communication between the first base station and a mobile station by judging, using radio resources allocation information which the first base station uses, whether a transmission signal of the mobile station to the first base station is included in a signal which the second base station received.

Further, radio resources allocation information is either of time slot information assigned to each mobile station, spreading code information assigned to each mobile station, or frequency band information assigned to each mobile station; or a combination of two or more of the information.

However, in this case, in case information which concerns a decision about a realization of a predetermined condition (load or communication quality of the first base station to become a predetermined state) cannot be collected by the second base station only, the information is received from other equipment (the RNC 200 or the first base station). In other words, the second base station is characterized by including a means which receives a transmission signal from a mobile station, and a means which, depending on a reception condition of the transmission signal concerned, starts transmission of the pilot signal with predetermined power when the predetermined condition is satisfied.

Also, a cell configuration of the first and the second base station of the radio communications system of the first to third exemplary embodiments described above can be made a hierarchy cell (also referred to as an overlap cell) structure. For example, it is also possible to make the first base station a macro cell, and the second base station a small cell (micro cell, nano cell or femto cell, for example) whose entire cover area is included in the cover area of the macro cell.

Further, as an example of handover of the first to third exemplary embodiments mentioned above, although a method to handover a mobile station after it is connected concurrently with two or more base stations (soft handover) is used, the soft handover is not indispensable. Form of handover which changes a base station of a connection destination of a mobile station does not matter. For example, a method, where timing to change connection is estimated at base stations of a handover source and a handover destination, and handover is performed without waiting for a time to connect concurrently (hard handover), can be used.

Although the present invention has been described with reference to exemplary embodiments above, the present invention is not limited to the exemplary embodiments mentioned above. Various changes which a person skilled in the art can understand within the scope of the present invention may be performed in the composition of the present invention and details.

This application is based upon and claims the benefit of priority from Japanese patent application No. 2008-275915, filed on Oct. 27, 2008, the disclosure of which is incorporated herein in its entirety by reference.

The invention claimed is:

1. A method for a radio base station, the method comprising:
    receiving, from a neighbor radio base station, deactivation information indicating that at least one cell of the neighbor radio base station is switched off; and
    sending, to the neighbor radio base station, a message requesting the neighbor radio base station to activate a cell among the at least one cell indicated by the deactivation information.

2. The method according to claim 1, the method further comprises:
    receiving a response for the message indicating that the cell among the at least one cell is activated from the neighbor radio base station after the cell among the at least one cell of the neighbor radio base station is activated upon reception of the message; and updating a list of neighbor cell information upon reception of the response.

3. The method according to claim 1, the method further comprises:
    updating a list of neighbor cell information including the at least one cell of the neighbor radio base station, upon reception of the deactivation information.

4. The method according to claim 1, wherein the switching off of the at least one cell of the neighbor radio base station is performed by suspension of at least transmission by the neighbor radio base station.

5. The method according to claim 1, wherein the switching off of the at least one cell of the neighbor radio base station is determined by the neighbor radio base station,
    wherein the activation of the cell among the at least one cell of the neighbor radio base station is determined by the radio base station.

6. A method for a radio base station, the method comprising:
    sending, to a neighbor radio base station, deactivation information indicating that at least one cell of the radio base station is switched off; and
    receiving, from the neighbor radio base station, a message requesting the base station to activate a cell among the at least one cell indicated by the deactivation information.

7. The method according to claim 6, wherein the switching off of the at least one cell of the radio base station is determined by the radio base station,
    wherein the activation of the cell among the at least one cell of the radio base station is determined by the neighbor radio base station.

8. A radio base station comprising:
    a hardware receiver configured to receive, from a neighbor radio base station, deactivation information indicating that at least one cell of the neighbor radio base station is switched off; and
    a hardware transmitter configured to send, to the neighbor radio base station, a message requesting the neighbor radio base station to activate a cell among the at least one cell indicated by the deactivation information.

9. The radio base station according to claim 8, wherein the switching off of the at least one cell of the neighbor radio base station is determined by the neighbor radio base station,
    wherein the activation of the cell among the at least one cell of the neighbor radio base station is determined by the radio base station.

10. A radio base station comprising:
    a hardware transmitter configured to send, to a neighbor radio base station, deactivation information indicating that at least one cell of the radio base station is switched off; and
    a hardware receiver configured to receive, from the neighbor radio base station, a message requesting the radio base station to activate a cell among the at least one cell indicated by the deactivation information.

11. The radio base station according to claim 10, wherein the switching off of the at least one cell of the radio base station is determined by the radio base station,
    wherein the activation of the cell among the at least one cell of the radio base station is determined by the neighbor radio base station.

* * * * *

UNITED STATES PATENT AND TRADEMARK OFFICE
CERTIFICATE OF CORRECTION

PATENT NO. : 10,499,331 B2
APPLICATION NO. : 16/145934
DATED : December 3, 2019
INVENTOR(S) : Toshifumi Nakamura et al.

It is certified that error appears in the above-identified patent and that said Letters Patent is hereby corrected as shown below:

In the Specification

Column 5, Exemplary Embodiments of the Invention, Line 62; Delete "controls," and insert --controls-- therefor Column 9, Exemplary Embodiments of the Invention, Line 57; Delete "operation," and insert --operation-- therefor Column 15, Exemplary Embodiments of the Invention, Line 52; Delete "0.200" and insert --200-- therefor Column 28, Exemplary Embodiments of the Invention, Line 31; Delete "signal," and insert --signal-- therefor Signed and Sealed this
Twenty-fourth Day of November, 2020

Andrei Iancu
*Director of the United States Patent and Trademark Office*